(12) United States Patent
McBryde et al.

(10) Patent No.: US 11,088,615 B2
(45) Date of Patent: Aug. 10, 2021

(54) BALANCING MULTILEVEL DC-DC CONVERTER APPARATUS

(71) Applicant: Eaton Intelligent Power Limited, Dublin (IE)

(72) Inventors: James Andrew McBryde, Wake Forest, NC (US); Swanand Juvekar, Morrisville, NC (US)

(73) Assignee: Eaton Intelligent Power Limited

( * ) Notice: Subject to any disclaimer, the term of this patent is extended or adjusted under 35 U.S.C. 154(b) by 0 days.

(21) Appl. No.: 16/549,867

(22) Filed: Aug. 23, 2019

(65) Prior Publication Data

US 2021/0057991 A1 Feb. 25, 2021

(51) Int. Cl.
  *H02M 3/07* (2006.01)
  *H02M 1/08* (2006.01)
  *H02J 9/06* (2006.01)

(52) U.S. Cl.
  CPC ............... *H02M 3/07* (2013.01); *H02M 1/08* (2013.01); *H02J 9/061* (2013.01)

(58) Field of Classification Search
  CPC ............. H02M 3/07; H02M 1/08; H02J 9/061
  USPC ......................................................... 323/311
  See application file for complete search history.

(56) References Cited

U.S. PATENT DOCUMENTS

| | | | |
|---|---|---|---|
| 6,819,576 B2 | 11/2004 | Johnson, Jr. | |
| 7,450,408 B2 * | 11/2008 | Tan | H02M 1/4216 363/132 |
| 8,513,928 B2 | 8/2013 | Totterman et al. | |
| 8,884,464 B2 * | 11/2014 | Jayaraman | H02M 3/1582 307/66 |
| 2008/0061628 A1 * | 3/2008 | Nielsen | H02J 9/062 307/66 |
| 2010/0054002 A1 * | 3/2010 | Lu | H02J 9/062 363/37 |

(Continued)

OTHER PUBLICATIONS

Balakishan et al., Design and Implementation of Three-Level DC-DC Converter with Golden Section Search Based MPPT for the Photovoltaic Applications, Advances in Power Electronics, 2015, 9 pages.

(Continued)

*Primary Examiner* — Yemane Mehari
(74) *Attorney, Agent, or Firm* — Stanek Lemon Crouse & Meeks, P.A.

(57) ABSTRACT

An apparatus includes a string of capacitors including at least two capacitors coupled in series and a switching circuit including a first port having first and second terminals connected to a first node and a second end node, respectively, of the string of capacitors, and a second port configured to be coupled to an energy storage device. The switching circuit is configured to selectively connect first and second terminals of the second port to a first end node, a second end node, and at least one interconnection node of the siring of capacitors. The apparatus also includes at least one inductor configured to be coupled in series with the second port of the switching circuit and the energy storage device and a charging switch configured to directly connect the first terminal of the second port to the second terminal of the second port. The apparatus further includes a control circuit configured to close the charging switch to charge the inductor from the energy storage device in first intervals and to selectively close at least two switches of the switching circuit in second intervals to selectively charge the capacitors of the string of capacitors from the charged at least one inductor.

19 Claims, 19 Drawing Sheets

(56) References Cited

U.S. PATENT DOCUMENTS

| | | | |
|---|---|---|---|
| 2012/0169126 A1* | 7/2012 | Totterman | H02M 3/1582 307/66 |
| 2013/0321070 A1* | 12/2013 | Gagne | G05F 1/12 327/538 |
| 2015/0084611 A1 | 3/2015 | Agrawal et al. | |
| 2015/0131349 A1 | 5/2015 | El-Barbari et al. | |
| 2018/0013346 A1 | 1/2018 | Westmoreland | |
| 2018/0275699 A1 | 9/2018 | Oughton | |
| 2018/0278075 A1 | 9/2018 | Oughton, Jr. | |

OTHER PUBLICATIONS

Burusteta et al., "Capacitor Voltage Balance Limits in a Multilevel-Converter-Based Energy Storage System," 2012, Technical University of Catalonia, Spain, 9 pages.

Kumar et al., "A New Control Method for Balancing DC-Link Voltage and Elimination of Common Mode Voltage in Multi-level Inverters," National Power Systems Conference, 2012, 8 pages.

Shi et al., "Capacitor Voltage Balancing of a Three-Level Bi-Directional Buck-Boost Converter for Battery Energy Storage System," 2014 $17^{th}$ International Conference on Electrical Machines and Systems (ICEMS), Oct. 22-25, 2014, Hangzhou, China, pp. 325-329.

Soman et al., "Analysis of Three-Level Buck-Boost Converter Operation for Improved Renewable Energy Conversion and Smart Grid Integration," ENERGYCON 2014, May 13-16, 2014, Dubrovnik, Croatia, pp. 76-81.

Zhang et al. "Three-Level DC Converter for Balancing DC 800-V Voltage" IEEE Transactions on Power Electronics, vol. 30, No. 7, 2015, pp. 3499-3507.

Extended European Search Report, for EP-20191834, dated Apr. 2, 2021.

* cited by examiner

BALANCING MULTILEVEL DC-DC CONVERTER APPARATUS

BACKGROUND

The inventive subject matter relates to electrical power apparatus and methods and, more particularly, to DC-DC converter apparatus.

Multi-level converters are used in a variety of applications, such as motor drives, photovoltaic (PV) inverters, uninterruptible power supply (UPS) systems, and other power conversion applications. Multi-level converters can have several advantages, such as improved output quality, reduced electromagnetic interference (EMI) and reduce voltage ratings for the transistors or other switching devices used to implement the converter.

In many systems, such as UPS system, a multi-level inverter used to generate an AC output may be connected to a DC energy storage device, such as a battery, supercapacitor bank, fuel cell, or the like, via a DC-DC converter. For greater load density applications, multiple multi-level inverters may be connected in parallel to meet the load demand. In such paralleled applications, it is generally desirable to regulate the DC voltages on the DC links connecting the DC-DC converters such that they are substantially uniform to reduce or eliminate circulating currents. A common technique for equalizing DC links is to use a balancing circuit that balances voltages across the various levels of the inverter. Examples of various types of balancing circuits are described in U.S. Pat. No. 6,819.576 to Johnson, Jr., U.S. Patent Application Publication No. 2018/0275699 to Oughton. Jr. and U.S. Patent Application Publication No. 2018/01278074 to Oughton, Jr.

SUMMARY

Some embodiments of the inventive subject matter provide an apparatus including a string of capacitors including at least two capacitors coupled in series and a switching circuit including a first port having first and second terminals connected to a first node and a second end node, respectively, of the string of capacitors, and a second port configured to be coupled to an energy storage device. The switching circuit is configured to selectively connect first and second terminals of the second port to a first end node, a second end node, and at least one interconnection node of the string of capacitors. The apparatus also includes at least one inductor configured to be coupled in series with the second port of the switching circuit and the energy storage device and a charging switch configured to directly connect the first terminal of the second port to the second terminal of the second port. The apparatus further includes a control circuit configured to close the charging switch to charge the inductor from the energy storage device in first intervals and to selectively close at least two switches of the switching circuit in second intervals to selectively charge the capacitors of the string of capacitors from the charged at least one inductor.

In some embodiments, the switching circuit may include at least one first switch configured to connect the first terminal of the first port to a first terminal of the second port, at least one second switch configured to connect the second terminal of the first port to a second terminal of the second port, and at least two third switches configured to connect the first and second terminals of the second port to the at least one interconnection node. The control circuit may be configured to selectively close the at least two third switches in the second intervals to selectively charge the capacitors of the string of capacitors from the charged at least one inductor.

In some embodiments, the at least two third switches may include respective switches configured to connect respective ones of the first and second terminals of the second port to a midpoint interconnection node of the string of capacitors. In further embodiments, the at least two third switches may include a first plurality of switches configured to connect the first terminal of the second port to a first set of interconnection nodes of the string of capacitors and a second plurality of switches configured to connect the second terminal of the second port to a second set of interconnection nodes of the string of capacitors. The first and second sets of interconnection nodes may each include a midpoint interconnection node.

According to further aspects, the control circuit may be configured to sense at least one voltage across at least one of the capacitors of the string of capacitors and to selectively close the at least two third switches in the second intervals responsive to the sensed at least one voltage. For example, the control circuit may be configured to selectively close the at least two third switches in the second intervals responsive to the sensed at least one voltage to balance voltages across the capacitors of the string of capacitors.

According to additional aspects, the at least two third switches may include a first transistor having a first voltage rating and wherein the charging switch includes a second transistor having a second voltage rating greater than the first voltage rating. The apparatus may further include an inverter coupled to the first port of the switching circuit.

In further embodiments of the inventive subject matter, an apparatus includes a string of capacitors including at least two capacitors coupled in series. The apparatus also includes a switching circuit including a first port having first and second terminals connected to respective first and second end nodes of the string of capacitors and a second port configured to be coupled to an energy storage device. The switching circuit further includes at least one first switch configured to connect the first terminal of the first port to a first terminal of the second port, at least one second switch configured to connect the second terminal of the first port to a second terminal of the second port, at least one third switch configured to connect the first terminal of the second port to a first interconnection node of the string of capacitors, at least one fourth switch configured to connect the second terminal of the second port to a second interconnection node of the string of capacitors, at least one fifth switch configured to connect the first terminal of the second port to a midpoint interconnection node of the string of capacitors, and at least one sixth switch configured to connect the second terminal of the second port to the midpoint interconnection node. The apparatus further includes at least one inductor configured to be coupled in series with the second port of the switching circuit and the energy storage device and a control circuit configured to cause the switching circuit to charge the at least one inductor in first intervals and to selectively close the at least one third switch, the at least one fourth switch, the at least one fifth switch, and the at least one sixth switch in second intervals to selectively charge the capacitors of the string of capacitors from the charged at least one inductor.

In some embodiments, the control circuit may be configured to close the at least one third switch and the at least one fourth switch to charge inner capacitors of the string of capacitors, to close the at least one filth switch to charge a first outer capacitor of the string of capacitors, and to close the at least one sixth switch to charge a second outer capacitor of the siring of capacitors. In some embodiments, the control circuit may be configured to close the at least one fifth switch and the at least one sixth switch in the first intervals to charge the at least one inductor. In further embodiments, the switching circuit may further include at least one seventh switch configured to directly connect the first terminal of the second port to the second terminal of the second port, and the control circuit may be configured to close the at least one seventh switch in the first intervals to charge the at least one inductor.

Still further embodiments provide an apparatus including a string of capacitors including at least two capacitors coupled in series and a switching circuit including a first port having first and second terminals connected to respective first and second end nodes of the string of capacitors and a second port configured to be coupled to an energy storage device. The switching circuit may include at least one first switch configured to connect the first terminal of the first port to a first terminal of the second port, at least one second switch configured to connect the second terminal of the first port to a second terminal of the second port, at least one third switch configured to connect the first terminal of the second port to a first interconnection node of the string of capacitors, at least one fourth switch configured to connect the second terminal of the second port to a second interconnection node of the string of capacitors, at least one fifth switch configured to connect the at least one third switch to a midpoint interconnection node of the string of capacitors, and at least one sixth switch configured to connect the at least one fourth switch to the midpoint interconnection node. The apparatus further includes at least one inductor configured to be coupled in series with the second port of the switching circuit and the energy storage device and a control circuit configured to cause the switching circuit to charge the inductor in first intervals and to selectively close the at least one third switch, the at least one fourth switch, the at least one fifth switch, and the at least one sixth switch in second intervals to selectively charge the capacitors of the string of capacitors from the charged at least one inductor.

In some embodiments, the at least one third switch may be configured to connect the first terminal of the second port to the first interconnection node via a first diode and the at least one fourth switch may be configured to connect the second terminal of the second port to the second interconnection node via a second diode. The control circuit may be configured to close the at least one third switch, the at least one fourth switch, the at least one fifth switch, and the at least one sixth switch in the first intervals to charge the at least one inductor. In further embodiments, the switching circuit may include at least one seventh switch configured to directly connect the first port of the second terminal to the second terminal of the second port and the control circuit may be configured to close the at least one seventh switch in the first intervals to charge the at least one inductor.

DETAILED DESCRIPTION

Figure 1:
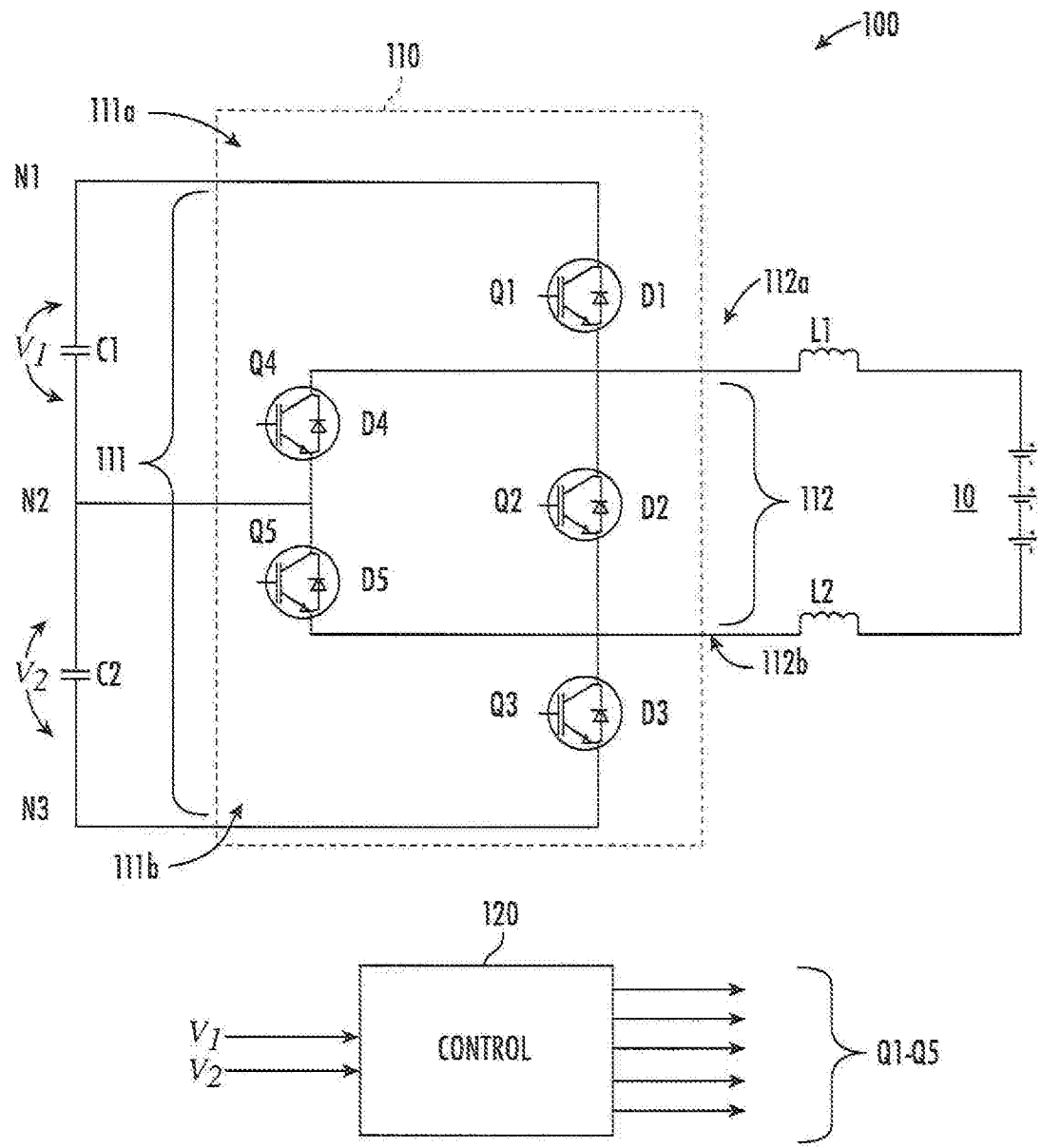
FIGS. 1-3 illustrate a 3-level DC-DC converter apparatus and operations thereof according to some embodiments.

Specific exemplary embodiments of the inventive subject matter now will be described with reference to the accompanying drawings. This inventive subject matter may, however, be embodied in many different forms and should not be construed as limited to the embodiments set forth herein; rather, these embodiments are provided so that this disclosure will be thorough and complete, and will fully convey the scope of the inventive subject matter to those skilled in the art. In the drawings, like numbers refer to like items. It will be understood that when an item is referred to as being "connected" or "coupled" to another item, it can be directly connected or coupled to the other item or intervening items may be present. As used herein the term "and/or" includes any and all combinations of one or more of the associated listed items.

The terminology used herein is for the purpose of describing particular embodiments only and is not intended to be limiting of the inventive subject matter. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, items, and/or components, but do not preclude the presence or addition of one or more other features, integers, steps, operations, items, components, and/or groups thereof.

Unless otherwise defined, all terms (including technical and scientific terms) used herein have the same meaning as commonly understood by one of ordinary skill in the art to which this inventive subject matter belongs. It will be further understood that terms, such as those defined in commonly used dictionaries, should be interpreted as having a meaning that is consistent with their meaning in the context of the specification and the relevant art and will not be interpreted in an idealized or overly formal sense unless expressly so defined herein.

Some embodiments of the inventive subject may provide improved DC link balancing in applications that use multi-level inverters, such as UPS applications. In some embodiments, improved link balancing may be provided by multi-level DC-DC converters that including switching circuitry that can be operated to provide selective charging of DC link capacitors for purposes of balancing DC link voltages.

FIG. 1 illustrates a three-level DC-DC converter apparatus 100 according to some embodiments. The apparatus 100 includes a string of series-connected first and second capacitors C1, C2. A switching circuit 110 has a first port 111 that has a first terminal 111*a* and a second terminals 111*b* that are coupled to respective first and second end nodes N1, N3 of the string of capacitors C1, C2. A second port 112 of the switching circuit 110 is configured to be coupled in series with first and second inductors L1, L2 and an energy storage device, here shown as a battery 10.

The switching circuit 110 includes a plurality of switches, here shown as first through fifth insulated gate bipolar transistors (IGBTs) Q1-Q5 having associated first through fifth parallel-connected diodes D1-D5. The transistors Q1-Q5 are configured to selectively couple first and second terminals 112a, 112b of the second port 112 to the end nodes N1, N3 and a midpoint interconnection node N2 of the string of capacitors C1, C2. In particular, the first transistor Q1 is configured to connect the first terminal 111a of the first port 111 to the first terminal 112a of the second port 112. The second transistor Q2 is configured to connect the first terminal 112a of the second port 112 to the second terminal 112b of the second port 112. The third transistor Q3 is configured to connect the second terminal 111b of the first port 111 to the second terminal 112b of the second port. The fourth transistor Q4 is configured to connect the first terminal 112a of the second port 112 to the midpoint interconnection node N2. The fifth transistor Q5 is configured to connect the second terminal 112b of the second port 112 to the midpoint interconnection node N2. A control circuit 120 controls the transistors Q1-Q5 responsive to voltages $v_1$, $v_2$ across respective ones of the capacitors C1, C2.

Figure 2:
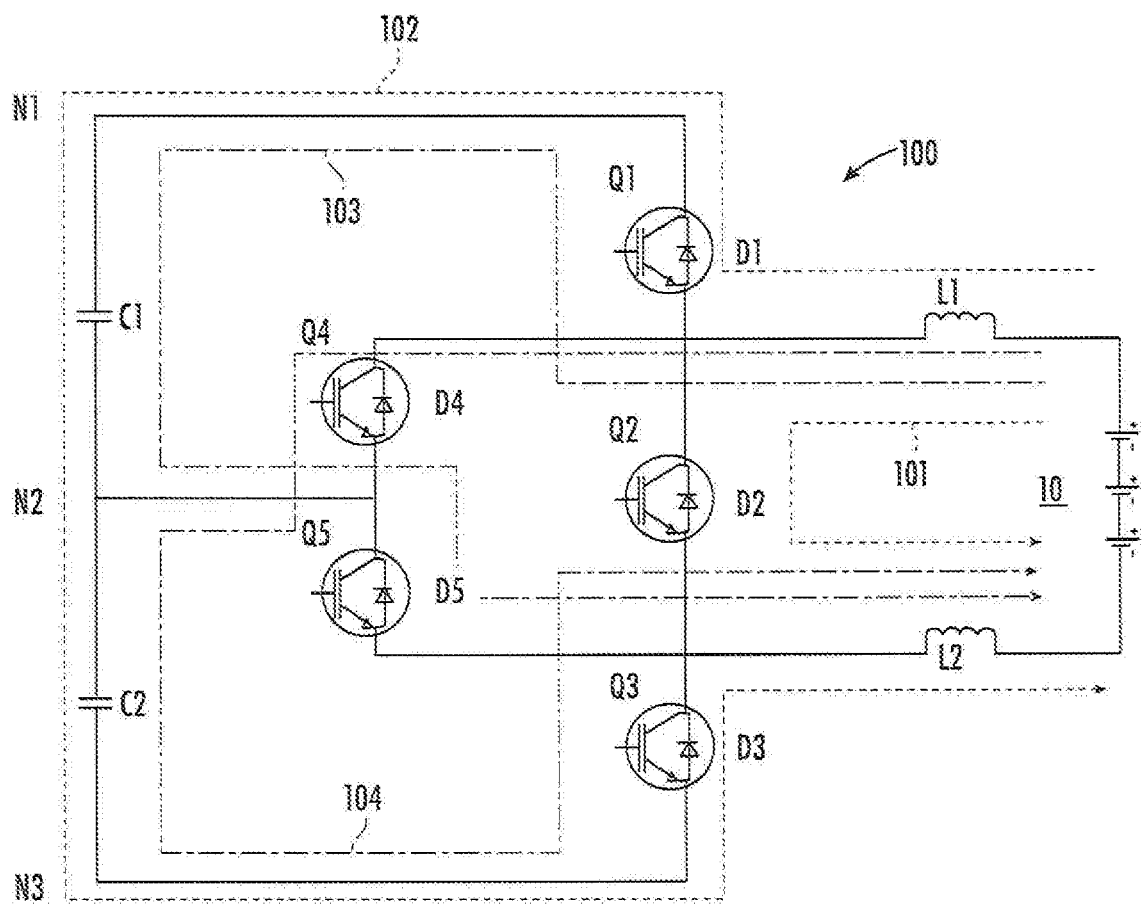
Figure 3:
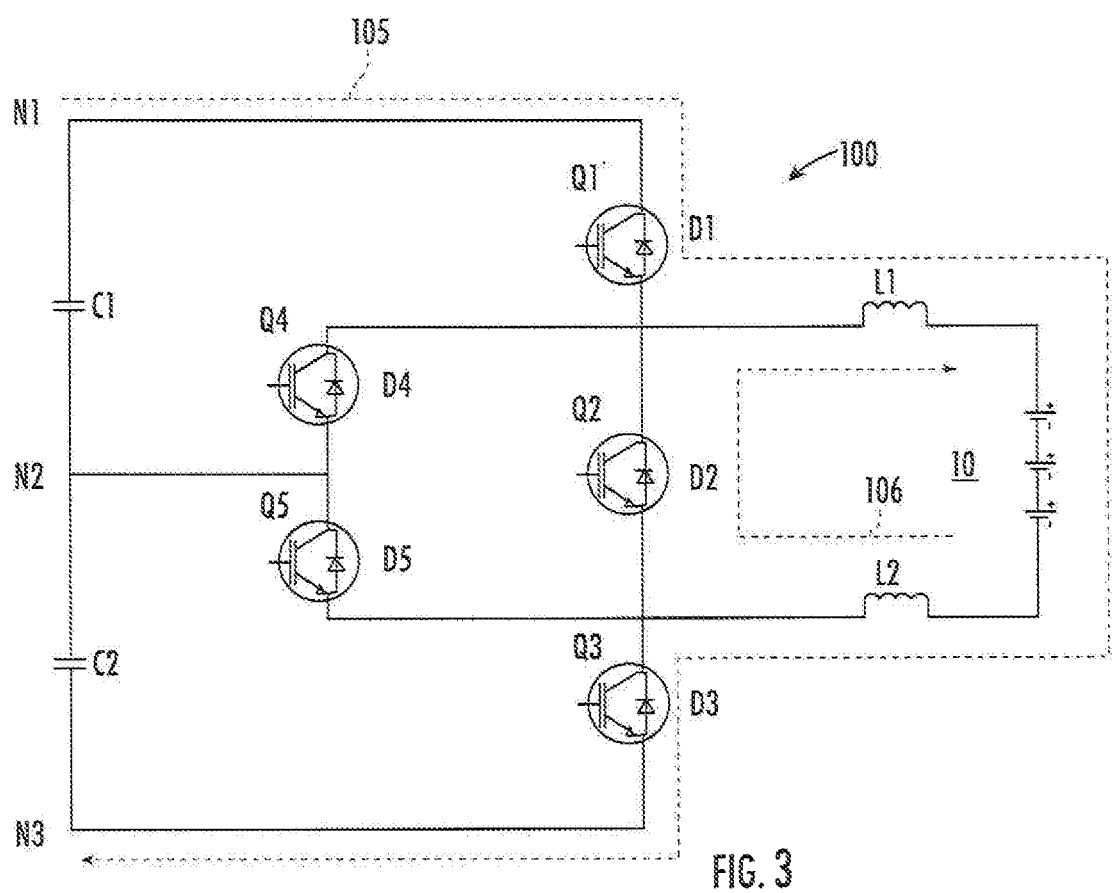

FIGS. 2 and 3 illustrate operations of the converter apparatus 100 of FIG. 1 according to some embodiments. In a boost mode, the apparatus 110 transfers power from the battery 10 by charging the inductors L1, L2 and selectively discharging the inductors L1, L2 into the first and second capacitors C1, C2 to regulate the capacitor voltages $v_1$, $v_2$. In first intervals, the control circuit 120 turns on (closes) the second transistor Q2, while the first transistor Q1, the third transistor Q3, the fourth transistor Q4 and the fifth transistor Q5 are off. This causes a first current 101 to flow through the first and second inductors L1, L2, thus charging the inductors L1, L2.

In second intervals succeeding respective ones of the first intervals, after the second transistor Q2 is turned off, the fourth transistor Q4 and the fifth transistor Q5 may be selectively turned on to provide additional current to selectively charge the first and second capacitors C1, C2 from the charged first and second inductors L1, L2. When the capacitor voltages $v_1$, $v_2$ are at desirable levels (in this case, substantially the same), the first and second capacitors C1, C2 may be simultaneously charged by a second current 102 passing through the first diode D1 and the third diode D3. If, however, the voltage $v_1$ across the first capacitor C1 is lower than the voltage $v_2$ across the second capacitor C2 (e.g., due to an unbalanced or half-wave rectified load), the first capacitor C1 may be selectively (preferentially) charged by turning on the fifth transistor Q5 to enable an additional third current 103 that results in charging the first capacitor C1 more than the second capacitor C2. Similarly, if the voltage $v_2$ across the second capacitor C2 is lower than the voltage $v_1$ across the first capacitor C1, the second capacitor C2 may be selectively charged by turning on the fourth transistor Q4 to enable an additional fourth current 104 that causes the second capacitor C2 to charge more than the first capacitor C1.

Referring to FIG. 3, in first intervals of a buck mode in which power is transferred to the battery 10, the first transistor Q1 and the third transistor Q3 may be turned on to provide a fifth current 105 that charges the first and second inductors L1, L2. In second intervals, a sixth current 106 from discharging of the inductors L1, L2 freewheels through the second diode D2, thus charging the battery 10.

According to further aspects, the configuration of the apparatus 100 allows for the use of different voltage ratings among the transistors Q1-Q5. In particular, the fourth transistor Q4 and the fifth transistor Q5 may have lower voltage ratings than the first transistor Q1, the second transistor Q2 and the third transistor Q3.

In 5-level inverter applications, the DC link may have a tendency towards imbalance. Different types of imbalances can occur, including an imbalance of the "positive" capacitors and the "negative" capacitors, which can occur when a half-wave rectified load is applied to the inverter. Another type of imbalance is an imbalance of the inner capacitors with respect to the outer capacitors, which may occur due to high crest factor loads on the inverter.

Figure 4:
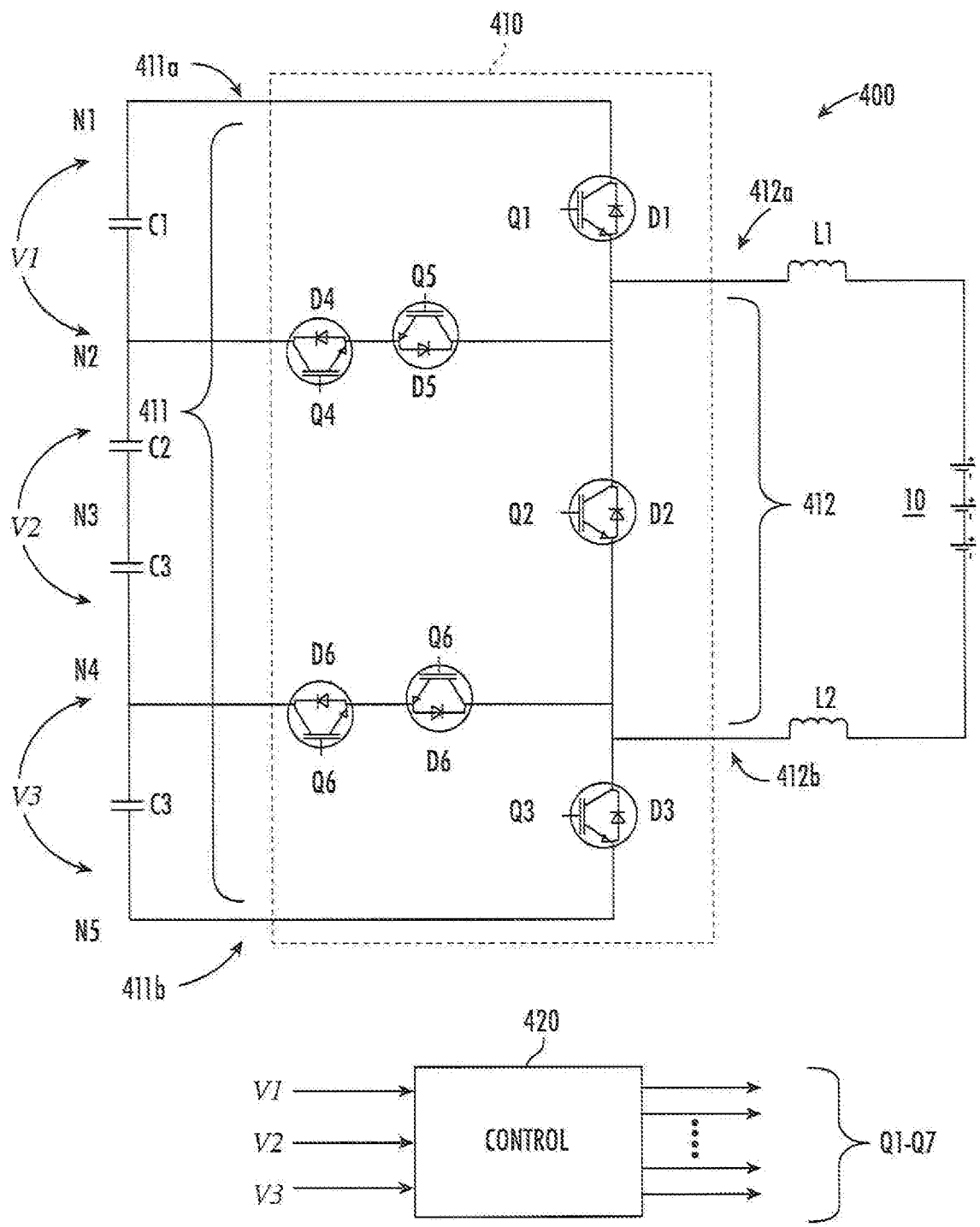
FIGS. 4-6 illustrate a 5-level DC-DC converter apparatus and operations thereof according to further embodiments.

FIG. 4 illustrates a five-level DC-DC converter apparatus 400 according to further embodiments that can be used to provide link balancing for such applications. The apparatus 400 includes a string of series-connected first, second, third and fourth capacitors C1, C2, C3, C4. A switching circuit 410 has a first port 411 that has a first terminal 411a and a second terminal 411b that are coupled to respective first and second end nodes N1, N5 of the string of capacitors C1-C4. A second port 412 of the switching circuit 410 is configured to be coupled in series with first and second inductors L1, L2 and an energy storage device, here shown as a battery 10.

The switching circuit 410 includes a plurality of switches, here shown as including first through seventh IGBts Q1-Q7 having associated first through seventh parallel connected diodes D1-D7. The first transistor Q1 is configured to connect the first terminal 411a of the first port 411 to the first terminal 412a of the second port 412. The second transistor Q2 is configured to connect the first terminal 412a of the second port 412 to the second terminal 412b of the second port 412. The third transistor Q3 is configured to connect the second terminal 411b of the first port 411 to the second terminal 412b of the second port 412. The fourth transistor Q4 and the fifth transistor Q5 act as a bidirectional switch configured to connect the first terminal 412a of the second port 412 to an interconnection node N2. The sixth transistor Q5 and the seventh transistor Q7 act as a bidirectional switch configured to connect the second terminal 412b of the second port 412 to a midpoint interconnection node N4. A control circuit 420 controls the transistors Q1-Q7 responsive to a voltage v across the second capacitor C2 and the third capacitor C3. The fourth transistor Q4, the fifth transistor Q5, the sixth transistor Q6 and the seventh transistor Q7 may have a lower voltage rating than the first transistor Q1, the second transistor Q2 and the third transistor Q3.

Figure 5:
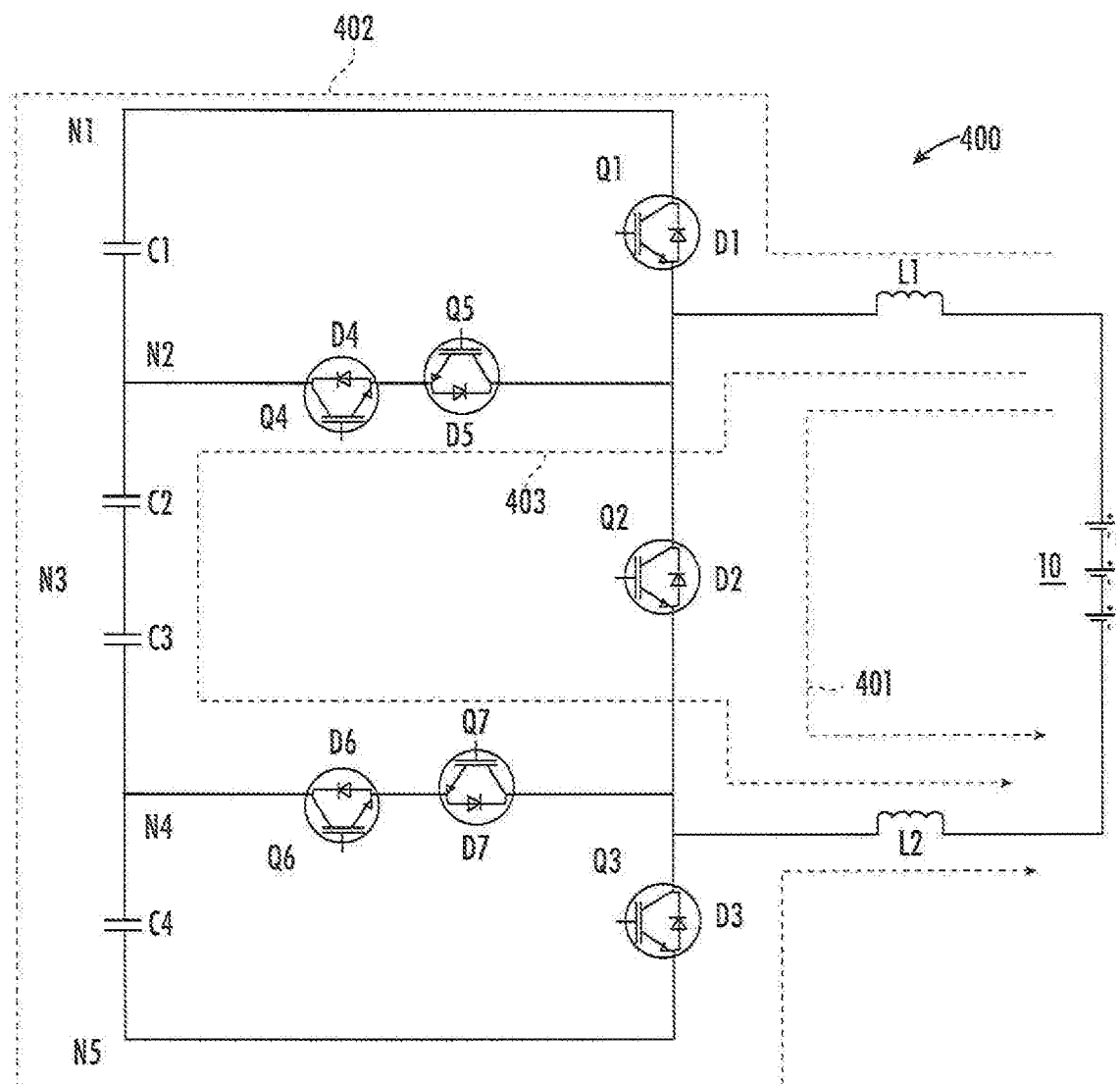
Figure 6:
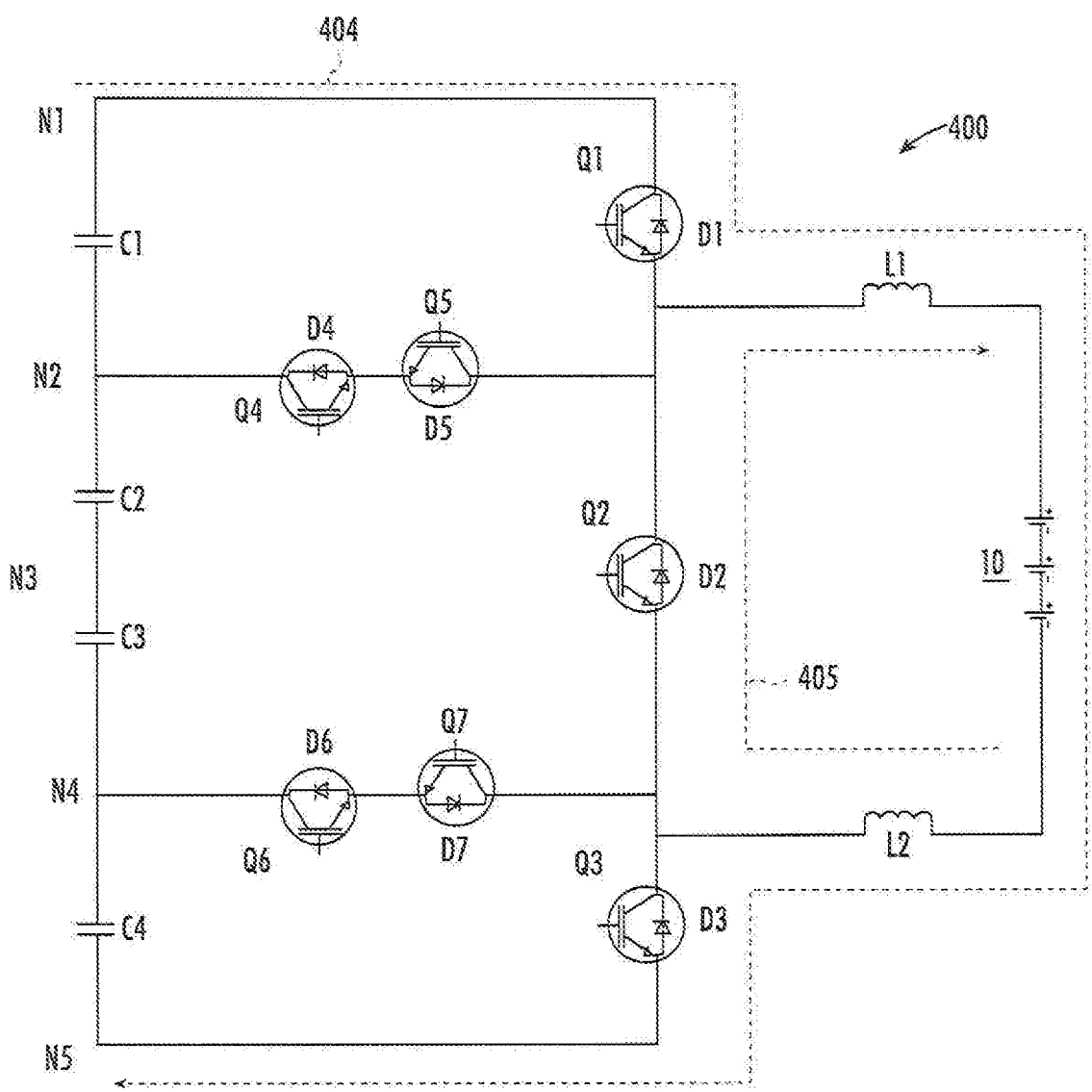

FIGS. 5 and 6 illustrate operations of the converter apparatus 400 of FIG. 4 for balancing capacitor voltages according to some embodiments. In first intervals of a boost mode, the control circuit 120 turns on the second transistor Q2 to causes a first current 401 to flow through the first and second inductors L1, L2, thus charging the inductors L1, L2. In second intervals succeeding respective ones of the first intervals, the second transistor Q2 is turned off, and the fourth transistor Q4, the fifth transistor Q5, the sixth transistor Q6 and the seventh transistor Q7 may be selectively turned on to selectively charge the capacitors C1-C4 from the charged first and second inductors L1, L2. When the voltages $v_1$, $v_2$, $v_3$ are at desirable relative levels (for example, such that the respective voltages across the capacitors C1-C4 are substantially the same), the capacitors C1-C4 may be simultaneously charged by a second current 402 passing through the first diode D1 and the third diode D3 with all of the transistors Q1-Q7 off. To boost the inner capacitor voltage $v_2$, the second capacitor C2 and the third capacitor C3 may be selectively charged by turning on the fourth transistor Q4, the fifth transistor Q5, the sixth transistor Q6 and the seventh transistor Q7 to cause a third current 403 to boost the voltage $v_2$ across the second capacitor C2 and the third capacitor C3. In first intervals of a buck mode shown in FIG. 6, the first transistor Q1 and the third transistor Q3 are turned on to conduct a fourth current 404 that charges the first and second inductors L1, L2. In second intervals, the transistors Q1-Q7 are turned off and a fifth current 405 freewheels through the second diode D2, thus charging the battery 10.

Figure 7:
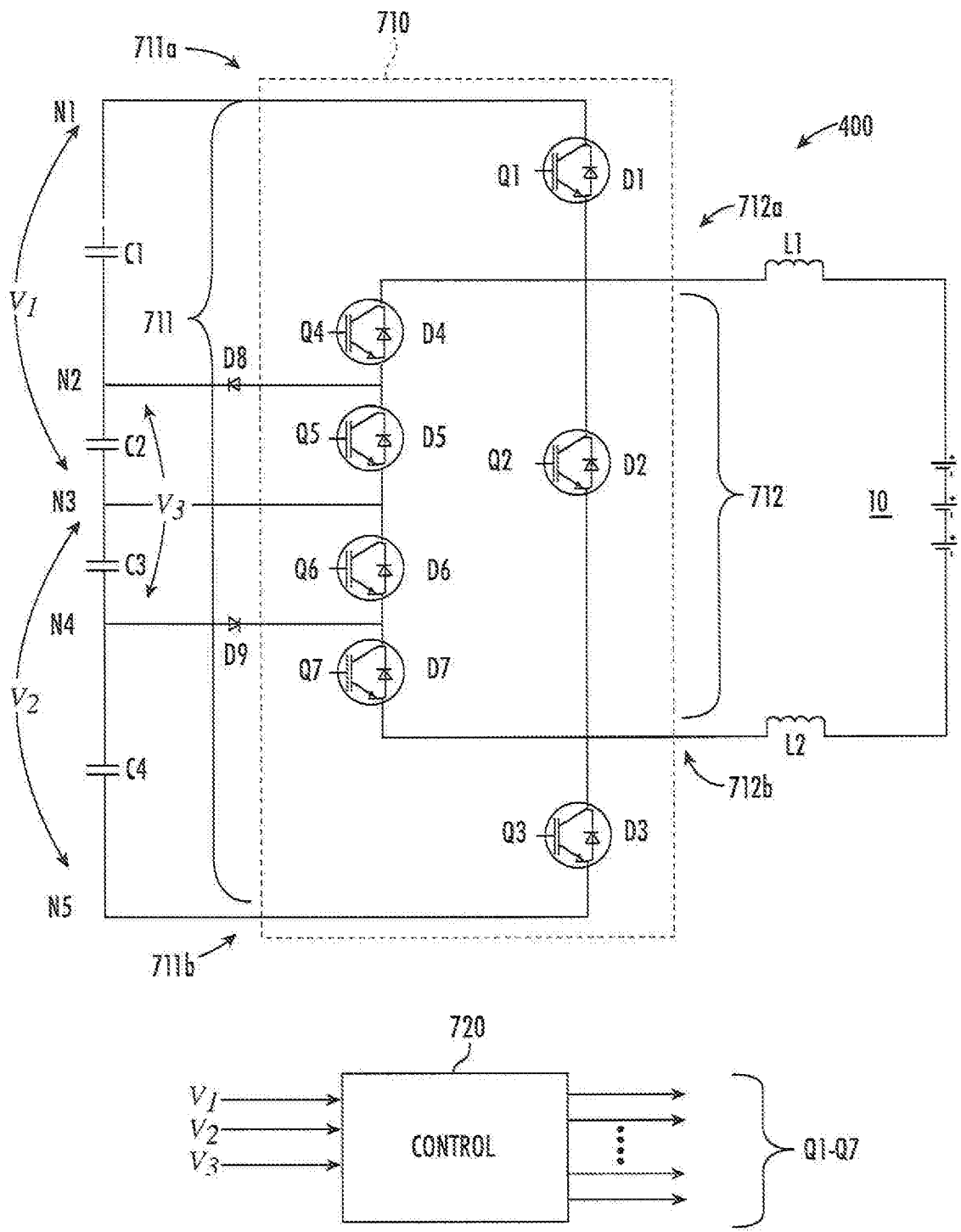
FIGS. 7-9 illustrate a 5-level DC-DC converter apparatus and operations thereof according to additional embodiments.

FIG. 7 illustrates a five-level DC-DC converter apparatus 700 according to further embodiments which can provide enhanced balancing capabilities. The apparatus 500 includes a string of series-connected first, second, third and fourth capacitors C1, C2, C3, C4. A switching circuit 710 has a first port 711 that has a first terminal 711a and a second terminal 711b that are coupled to respective first and second end nodes N1, N5 of the string of capacitors C1-C4. A second port 712 of the switching circuit 710 is configured to be coupled in series with first and second inductors L1, L2 and an energy storage device, here shown as a battery 10.

The switching circuit 710 includes a plurality of switches, here shown as including first through seventh insulated gate bipolar transistors (IGBTs) Q1-Q7 and associated first through seventh parallel-connected diodes D1-D7, along with additional eighth and ninth diodes D8, D9. The first transistor Q1 is configured to connect the first terminal 711a of the first port 711 to the first terminal 712a of the second port 712. The second transistor Q2 is configured to connect the first terminal 712a of the second port 712 to the second terminal 712b of the second port 712. The third transistor Q3 is configured to connect the second terminal 711b of the first port 711 to the second terminal 712b of the second port 712. The fourth transistor Q4 is configured to couple the first terminal 712a of the second port 712 to the first interconnection node N2 via the eighth diode D8. The fifth transistor Q5 is configured to connect an emitter terminal of the fourth transistor Q4 to the midpoint interconnection node N3. The seventh transistor Q7 is configured to connect the second terminal 712b of the second port 712 to the interconnection node N4. The sixth transistor Q6 is configured to connect a collector terminal of the seventh transistor Q7 to the midpoint interconnection node N3. A control circuit 720 controls the transistors Q1-Q7 responsive to a voltage $v_1$ across the first capacitor C1 and the second capacitor C2, a voltage $v_2$ across the third capacitor C3 and the fourth capacitor C4, and a voltage $v_3$ across the second capacitor C2 and the third capacitor C3. In the apparatus 700, the fourth transistor Q4, the fifth transistor Q5, the sixth transistor Q6 and the seventh transistor Q7 may have a lower voltage rating than the first transistor Q1, the second transistor Q2 and the third transistor Q3.

Figure 8:
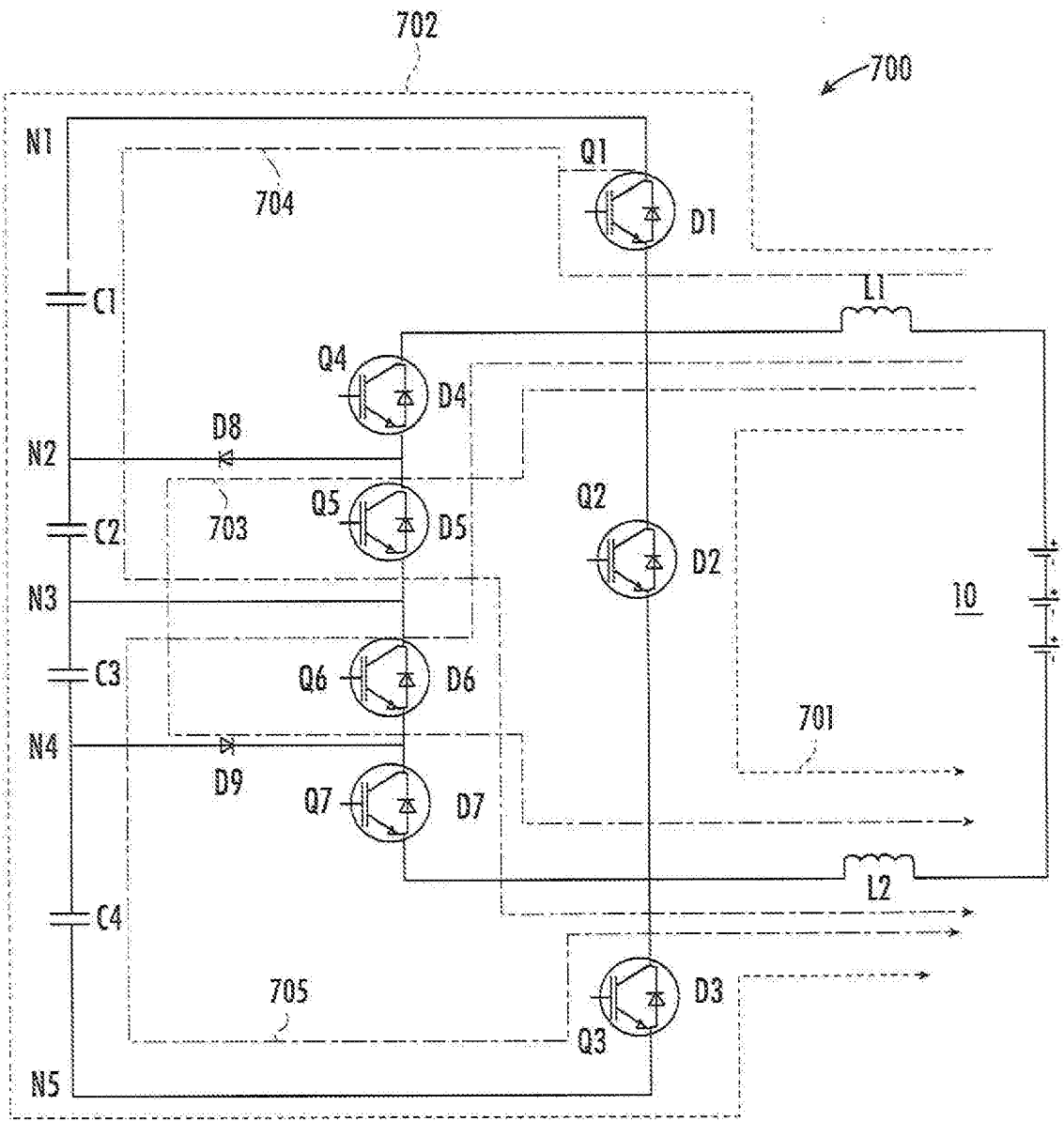
Figure 9:
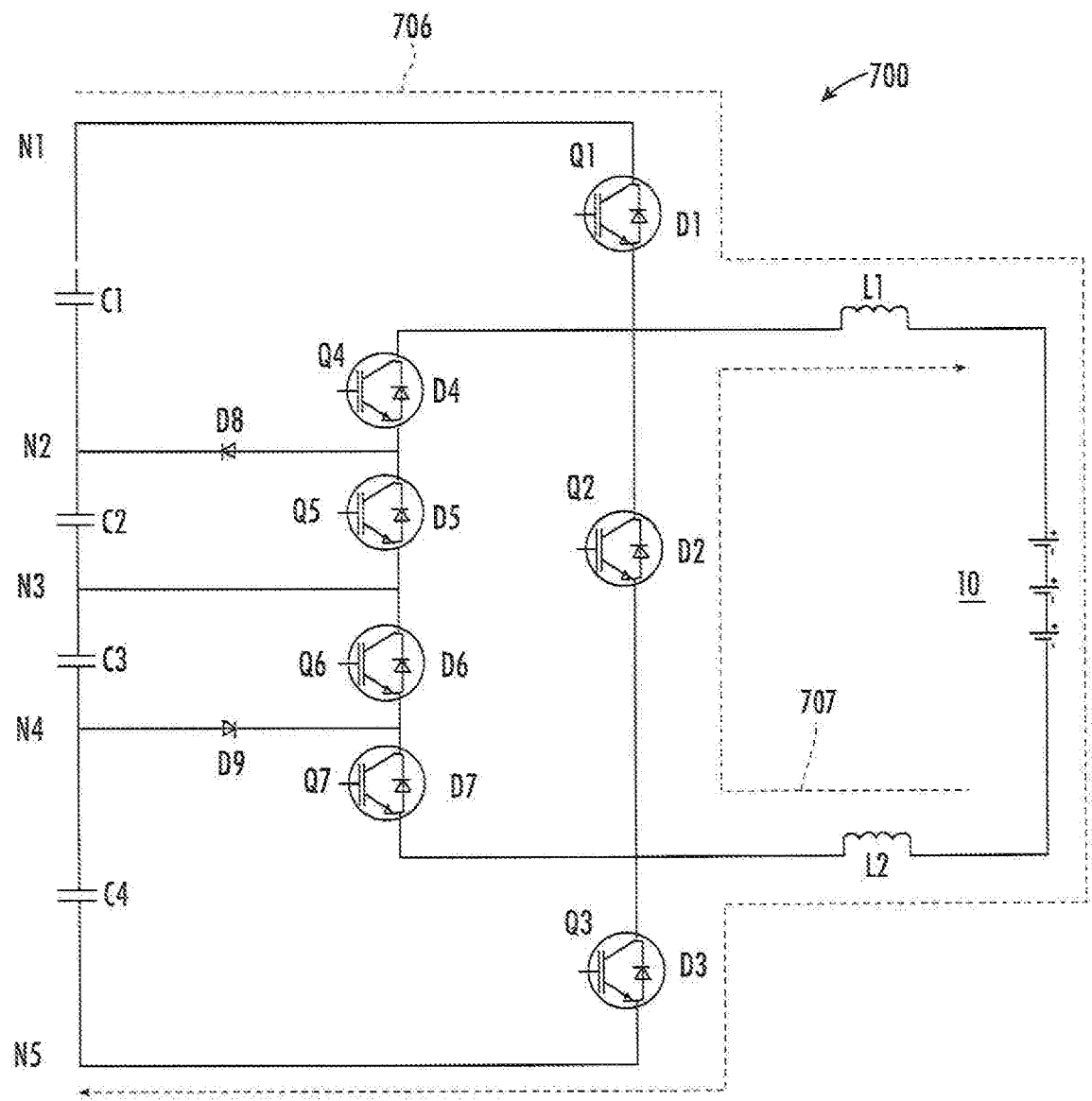

FIGS. 8 and 9 illustrate operations of the converter apparatus 700 according to some embodiments. In first intervals of a boost mode, the control circuit 720 turns on the second transistor Q2 to conduct a first current 701 that flows through the first and second inductors L1, L2, thus charging the inductors L1, L2. In second intervals succeeding respective ones of the first intervals, the second transistor Q2 is turned off, and the fourth transistor Q4, the fifth transistor Q5, the sixth transistor Q6 and the seventh transistor Q7 can be selectively turned on to selectively charge the capacitors C1-C4 from the charged first and second inductors L1, L2. When the voltages $v_1$, $v_2$, $v_3$ across all of the capacitors C1-C4 are at desirable relative levels (for example, such that the respective voltages across the capacitors C1-C4 are substantially the same), the capacitors C1-C4 may be simultaneously charged by a second current 702 passing through the first diode D1 and the third diode D3. If the voltage $v_3$ is low, the second capacitor C2 and the third capacitor C3 may be charged by turning on the fourth transistor Q4, the fifth transistor Q5, the sixth transistor Q6 and the seventh transistor Q7 to conduct a third current 703 that charges the second capacitor C2 and the third capacitor C3. If the voltage $v_1$ is low, these first capacitor C1 and the second capacitor C2 can be charged by turning on the sixth transistor Q6 and the seventh transistor Q7 to conduct a fourth current 704 that charges the first capacitor C1 and the second capacitor C2. Similarly, if the voltage $v_2$ is low, the third capacitor C3 and the fourth capacitor C4 can be charged by turning on the fourth transistor Q4 and the fifth transistor Q5 to conduct a fifth current 705. Referring to FIG. 9, in first intervals of a buck mode, the apparatus 700 turns on the first transistor Q1 and the third transistor Q3 to conduct a sixth current 706 that charges the first and second inductors L1, L2. In succeeding second intervals, the transistors are turned off and a seventh current 707 freewheels through the second diode D2, thus charging the battery 10.

Figure 10:
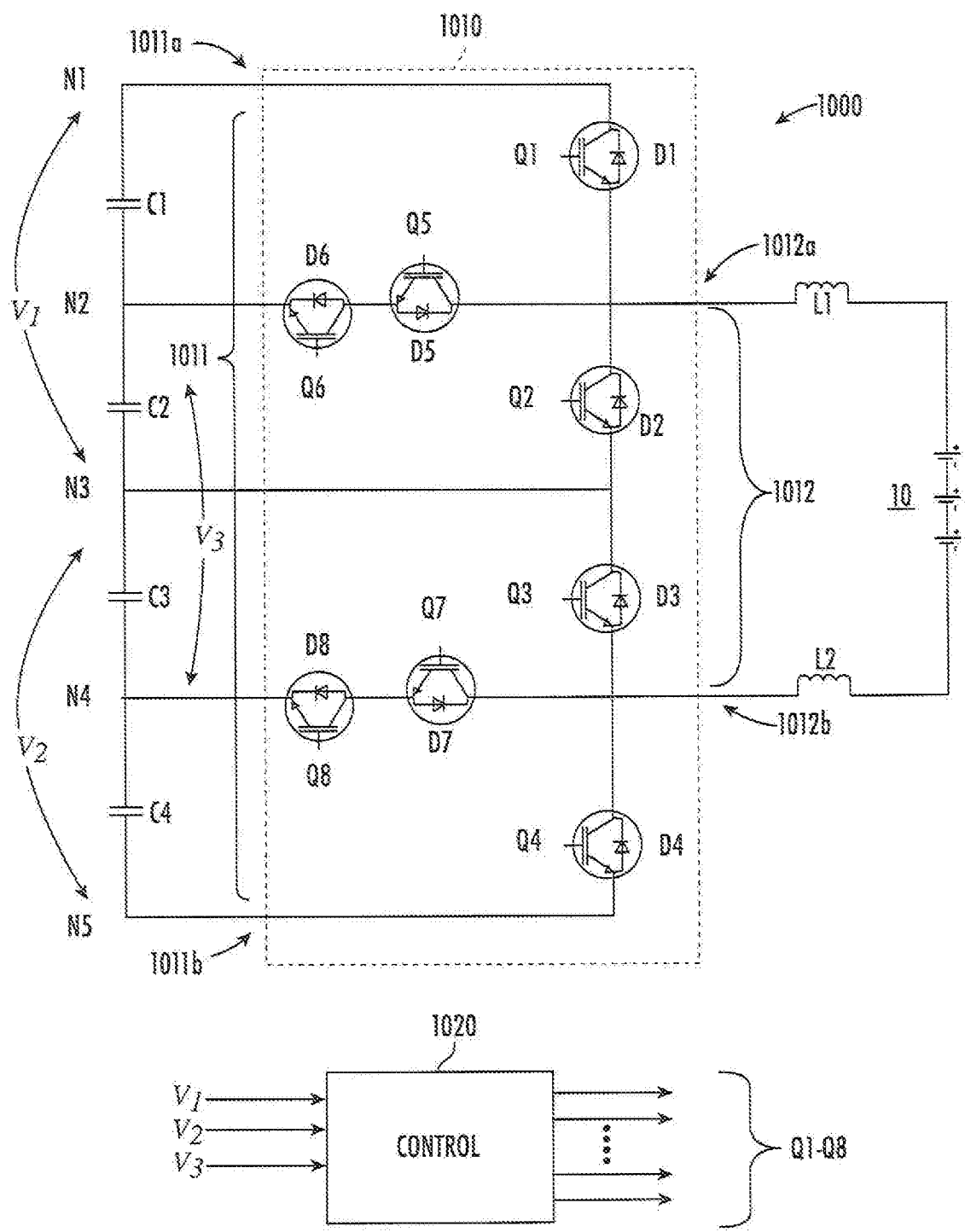
FIGS. 10-12 illustrate a 5-level DC-DC convener apparatus and operations thereof according to timber embodiments.

FIG. 10 illustrates a five-level DC-DC converter apparatus 1000 according to further embodiments. The apparatus 1000 includes a string of series-connected first, second, third and fourth capacitors C1, C2, C3, C4. A switching circuit 1010 has a first port 1011 that has a first terminal 1011a and a second terminal 1011b that are coupled to respective first and second end nodes N1, N5 of the string of capacitors C1-C4. A second port 1012 of the switching circuit 1010 is configured to be coupled in series with first and second inductors L1, L2 and an energy storage device, here shown as a battery 10.

The switching circuit 1010 includes a plurality of switches, here shown as including first through eighth IGBTs Q1-Q8 having associated first through eighth parallel-connected diodes D1-D8. The first transistor Q1 is configured to connect the first terminal 1011a of the first port 1011 to the first terminal 1012a of the second port 1012. The second transistor Q2 is configured to connect the first terminal 1012a of the second port 1012 to a midpoint interconnection node N3. The third transistor Q3 is configured to connect the second terminal 1012b of the second port 1012 to the midpoint interconnection node N3. The fourth transistor Q4 is configured to connect the second terminal 1011b of the first port 1011 to the second terminal 1012b of the second port 1012. The fifth transistor Q5 and the sixth transistor Q6 act as a bidirectional switch configured to connect the first terminal 1012a of the second port 1012 to an interconnection node N2. The seventh transistor Q7 and the eight transistor Q8 act as a bidirectional switch configured to connect the second terminal 1012b of the second port to an interconnection node N4. A control circuit 1020 controls the transistors Q1-Q7 responsive to a voltage $v_1$ across the first capacitor C1 and the second capacitor C2, a voltage $v_2$ across the third capacitor C3 and the fourth capacitor C4, and a voltage $v_3$ across the second capacitor C2 and the third capacitor C3. In the apparatus 1000, the second transistor Q2, the third transistor Q3, the fifth transistor Q5, the sixth transistor Q6, the seventh transistor Q7, and the eighth transistor Q8 may have a lower voltage rating than the first transistor Q1 and the fourth transistor Q4.

Figure 11:
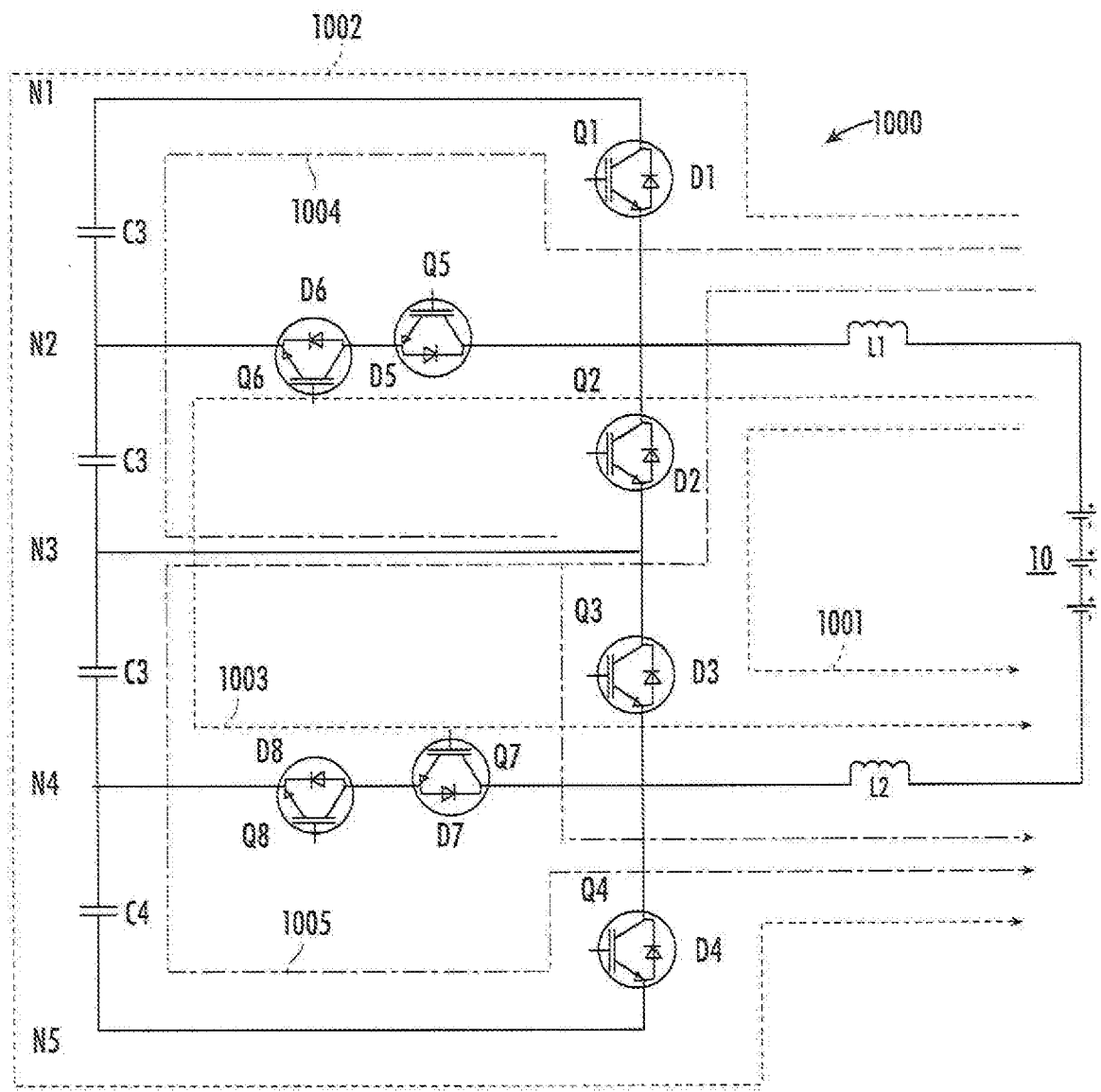
Figure 12:
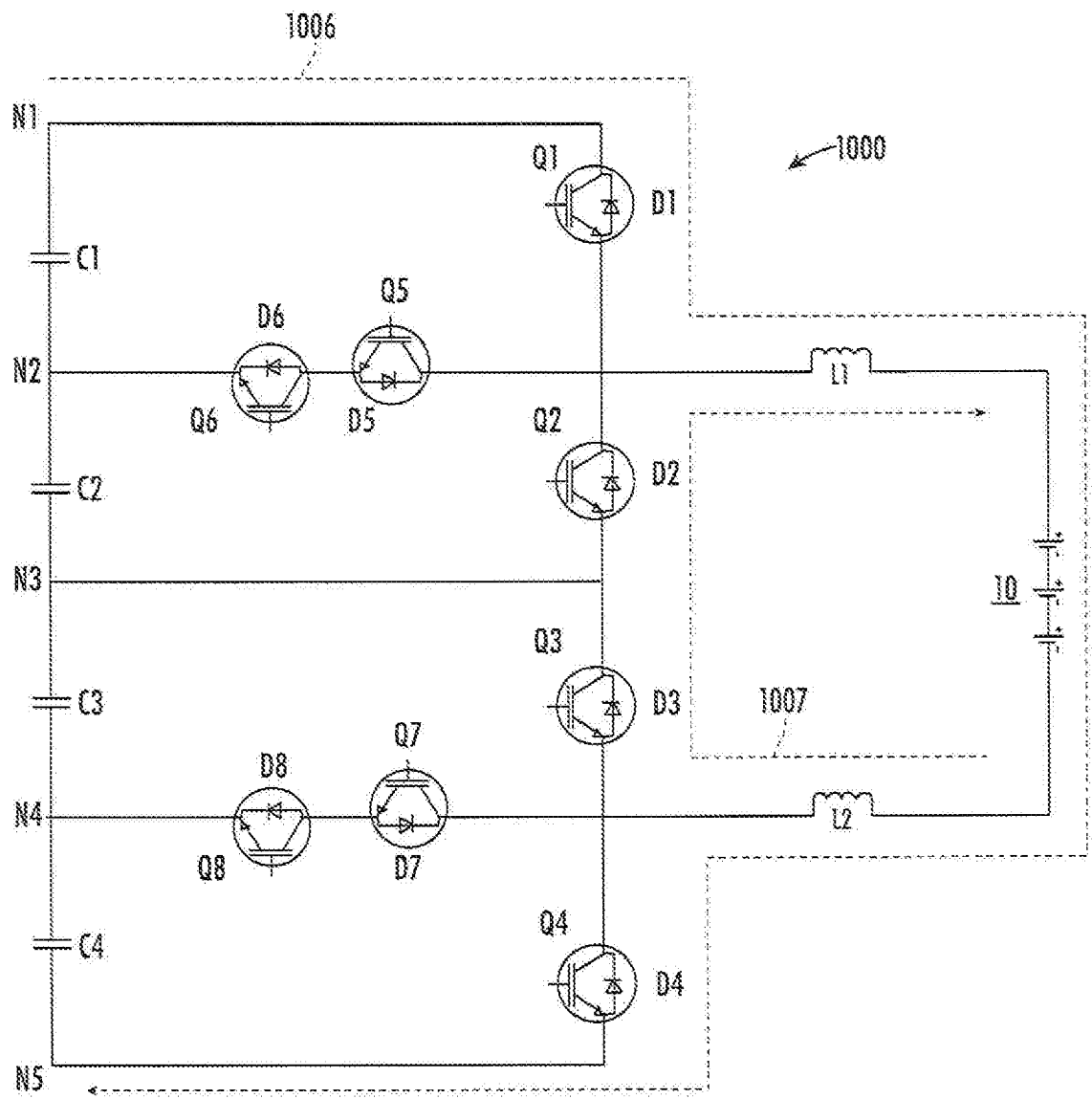

FIGS. 11 and 12 illustrate operations of the converter apparatus 1000 according to some embodiments. In first intervals of a boost mode, the control circuit 1020 turns on the second transistor Q2 and the third transistor Q3 to conduct a first current 1001 through the first and second inductors L1, L2, thus charging tire inductor L1, L2. In second intervals succeeding respective ones of the first intervals, the second transistor Q2, the third transistor Q3, the fifth transistor Q5, the sixth transistor Q6, the seventh transistor Q7, and the eighth transistor Q8 can be selectively turned on to selectively charge the capacitors C1-C4 from the charged first and second inductors L1, L2. When the voltages $v_1$, $v_2$, $v_3$ across all of the capacitors C1-C4 are at desirable relative levels (for example, such that the voltages across each of the capacitors C1-C4 are substantially the same), the capacitors C1-C4 may be simultaneously charged by a second current 1002 passing through the first diode D1 and the fourth diode D4. If the voltage $v_3$ requires boosting, the second capacitor C2 and the third capacitor C3 may be charged by turning on the fifth transistor Q5, the sixth transistor Q6, the seventh transistor Q7, and the eighth transistor Q8 to conduct a third current 1003. If the voltage $v_1$ requires boosting, the first capacitor C1 and the second capacitor C2 can be charged by turning on the third transistor Q3 to conduct a fourth current 1004. Similarly, if the voltage $v_2$ requires boosting, the third capacitor C3 and the fourth capacitor C4 can be charged by turning on the second transistor Q2 to conduct a fifth current 1005. Referring to FIG. 12, in first intervals of a buck mode, the apparatus 1000 turns on the first transistor Q1 and the fourth transistor Q4 to conduct a sixth current 1006 that charges the first and second inductors L1, L2, and then the transistors are turned off and a seventh current 1007 freewheels through the second diode D2 and the third diode D3 to charge the battery 10.

Figure 13:
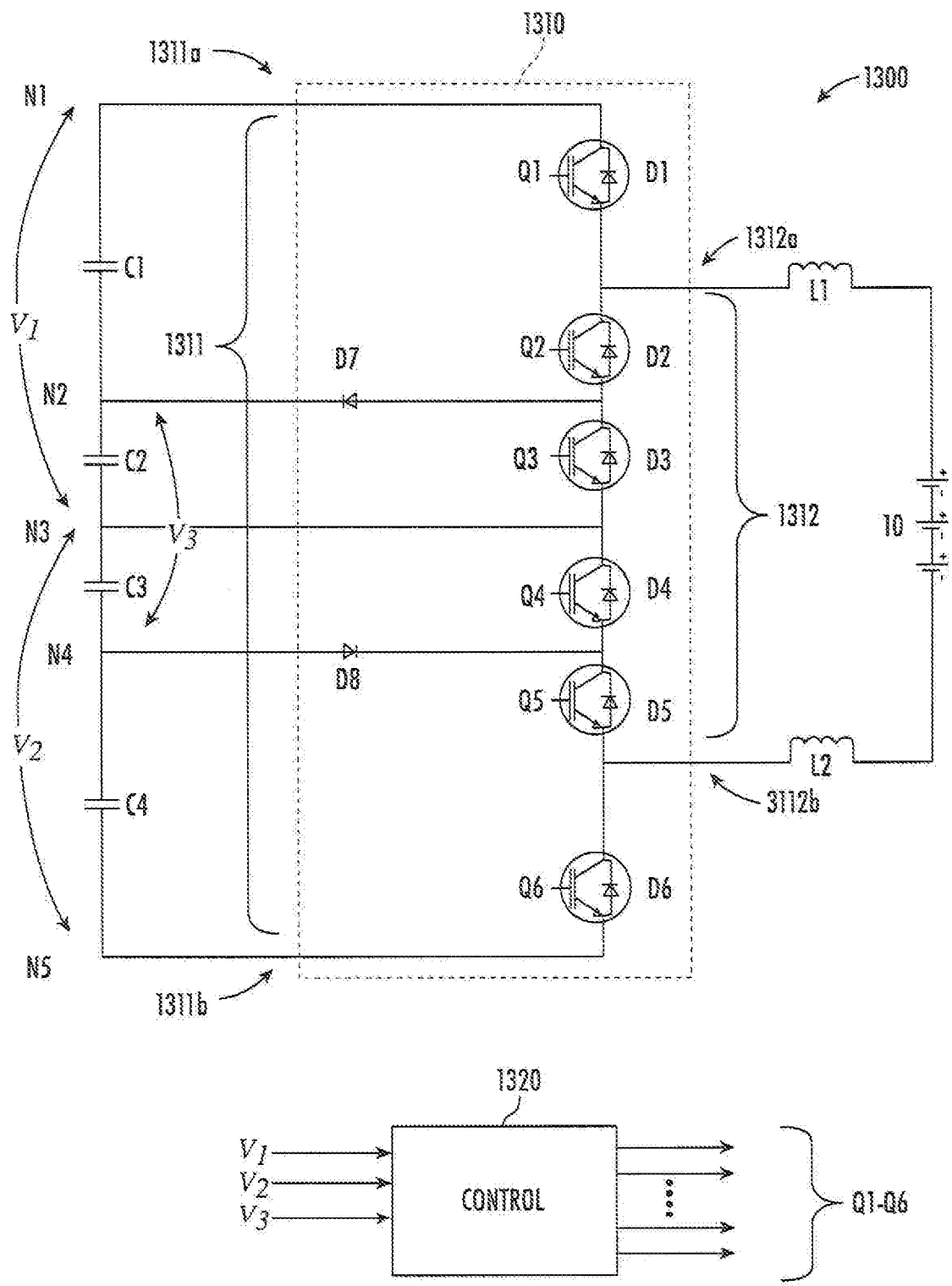
FIGS. 13-15 illustrate a 5-level DC-DC converter apparatus and operations thereof according to still further embodiments.

FIG. 13 illustrates a five-level DC-DC converter apparatus 1300 according to still further embodiments. The apparatus 500 includes a siring of series-connected first second, third and fourth capacitors C1, C2, C3, C4. A switching circuit 1310 has a first port 1311 that has a first terminal 1311a and a second terminal 1311b that are coupled to respective first and second end nodes N1, N5 of the string of capacitors C1-C4. A second port 1312 of the switching circuit 1310 is configured to be coupled in series with first and second inductors L1, L2 and an energy storage device, here shown as a battery 10.

The switching circuit 1310 includes a plurality of switches, here shown as including first through sixth IGBTs Q1-Q6 having associated first through sixth parallel connected diodes D1-D6, along with additional seventh and eighth diodes D7, D8. The first transistor Q1 is configured to connect the first terminal 1311a of the first port 1311 to the first terminal 1312a of the second port 1312. The sixth transistor Q6 is configured to connect the second terminal 1311b of the first port 1311 to the second terminal 1312b of the second port 1312. The second transistor Q2 is configured to couple the first terminal 1312a of the second port 1312 to a first interconnection node N2 via the seventh diode D7. The third transistor Q3 is configured to connect an emitter terminal of the second transistor Q2 to a midpoint interconnection node N3. The fifth transistor Q5 is configured to connect the second terminal 1312b of the second port 1312 to an interconnection node N4 via the eighth diode D8. The fourth transistor Q4 is configured to connect a collector terminal of the fifth transistor Q5 to the midpoint interconnection node N3. A control circuit 1320 controls the transistors Q1-Q6 responsive to a voltage $v_1$ across the first capacitor C1 and the second capacitor C2, a voltage $v_2$ across the third capacitor C3 and the fourth capacitor C4, and a voltage $v_3$ across the second capacitor C2 and the third capacitor C3. In the apparatus 1300, the second transistor Q2, the third transistor Q3, the fourth transistor Q4 and the fifth transistor Q5 may have a lower voltage rating than the first transistor Q1 and the sixth transistor Q6.

Figure 14:
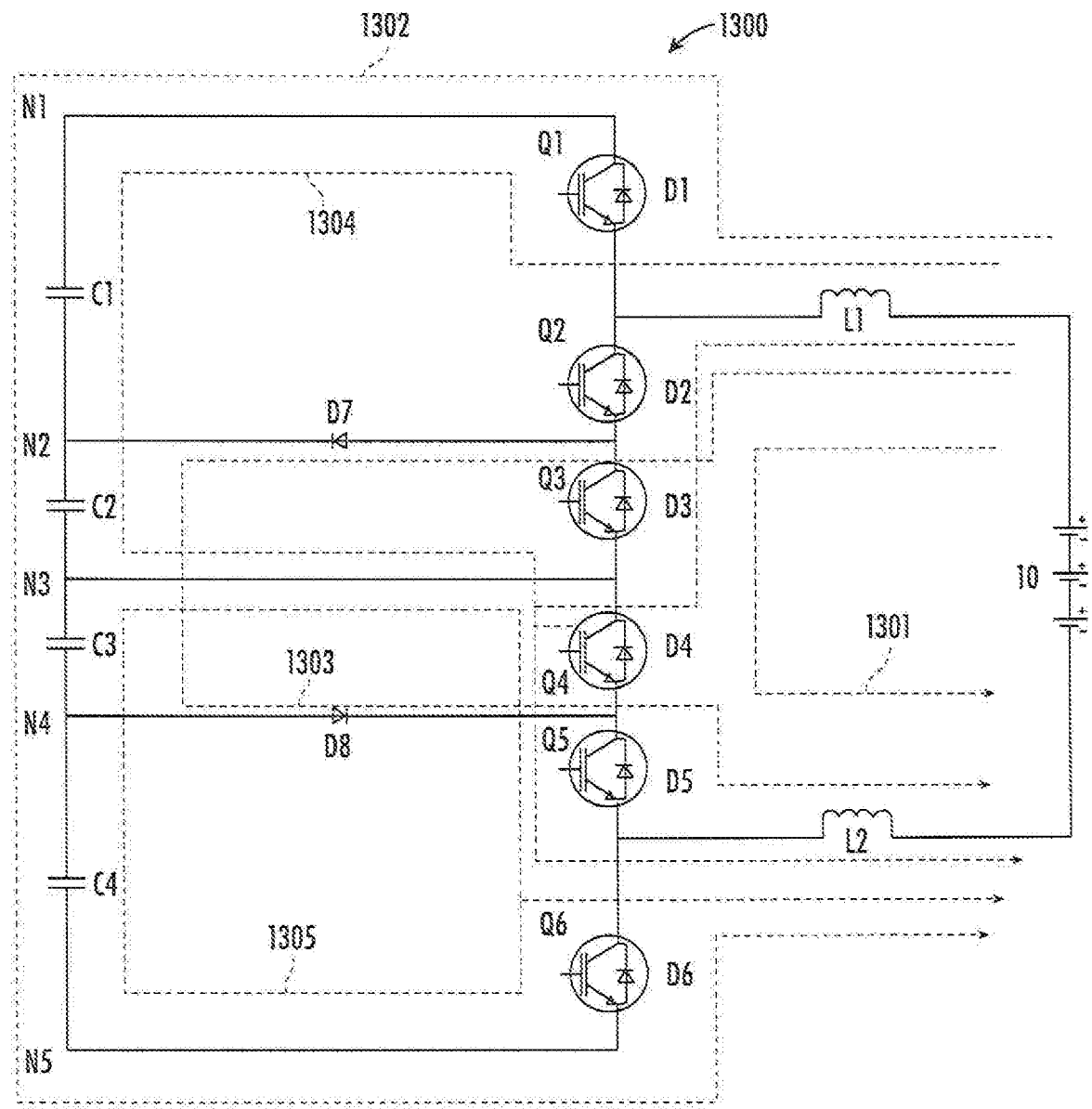
Figure 15:
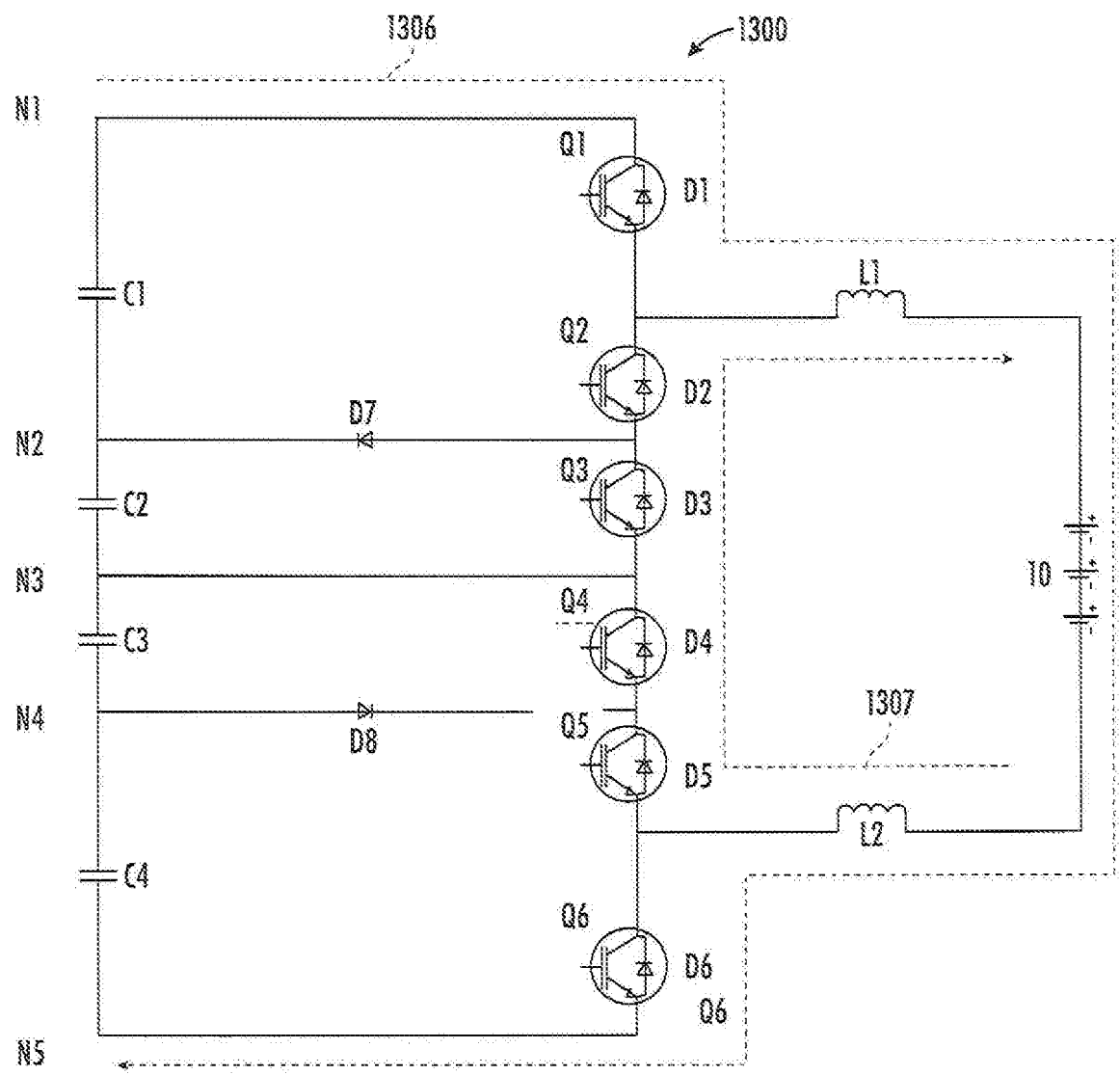

FIGS. 14 and 15 illustrate operations of the converter apparatus 1300 according to some embodiments. In first intervals of a boost mode, the control circuit 1320 turns on the second transistor Q2, the third transistor Q3, the fourth transistor Q4, and the fifth transistor Q5 to conduct a first current 1301 that charges the first and second inductors L1, L2. In second intervals succeeding respective ones of the first intervals, the transistors Q1-Q6 can be selectively turned on to selectively charge the capacitors C1-C4 from the charged first and second inductors L1, L2. When the voltages $v_1$, $v_2$, $v_3$ across all of the capacitors C1-C4 are at desirable relative levels (for example, such that the voltages across each of the capacitors C1-C4 are substantially the same), the capacitors C1-C4 may be simultaneously charged by a second current 1302 passing through the first diode D1 and the sixth diode D6. If the voltage $v_3$ requires boosting, the second capacitor C2 and the third capacitor C3 may be charged by turning on the second transistor Q2 and the fifth transistor Q5 to conduct a third current 1303. If the voltage $v_1$ requires boosting, the first capacitor C1 and the second capacitor C2 can be charged by turning on the fourth transistor Q4 and the fifth transistor Q5 to conduct a fourth current 1304. Similarly, if the voltage requires boosting, the third capacitor C3 and the fourth capacitor C4 can be charged by turning on the second transistor Q2 and the third transistor Q3 to conduct a fifth current 1305. Referring to FIG. 15, in first intervals of a buck mode, the apparatus 1300 turns on the first transistor Q1 and the sixth transistor Q6 to conduct a sixth current 1306 that charges the first and second inductors L1, L2. In succeeding second intervals, the transistors Q1-Q6 are all turned off and seventh current 1307 freewheels through the second diode D2, the third diode D3, the fourth diode D4 and the fifth diode D5 to charge the battery 10.

Figure 16:
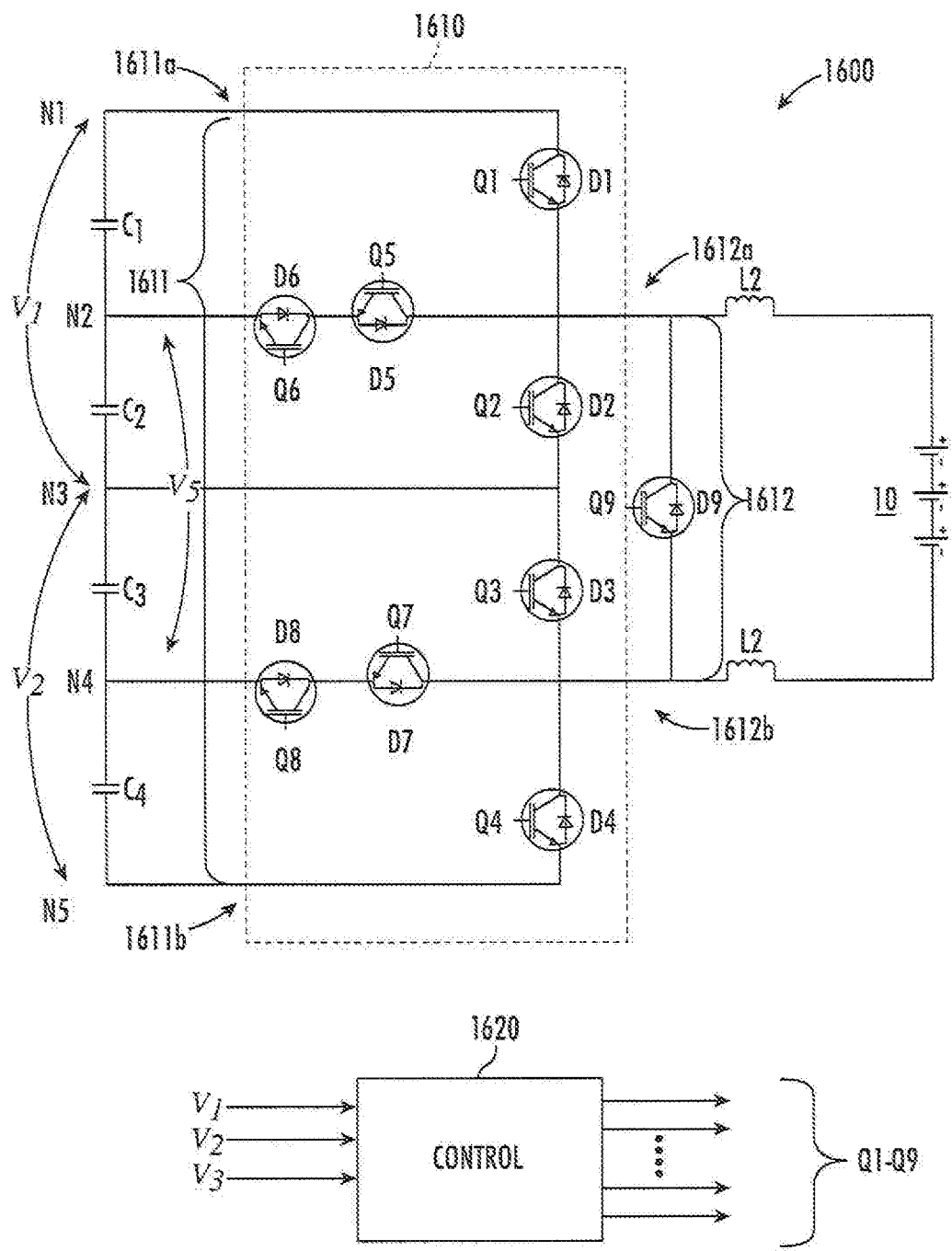
FIGS. 16-18 illustrate a 5-level DC-DC converter according to some embodiments.

FIG. 16 illustrates a five-level DC-DC converter apparatus 1600 according to further embodiments. The apparatus 1600 includes a string of series-connected first, second, third and fourth capacitors C1, C2, C3, C4. A switching circuit 1610 has a first port 1611 that has a first terminal 1611a and a second terminal 1611b that are coupled to respective first and second end nodes N1, N5 of the string of capacitors C1-C4. A second port 1612 of the switching circuit 1610 is configured to be coupled in series with first and second inductors L1, L2 and an energy storage device, here shown as a battery 10.

The switching circuit 1610 includes a plurality of switches, here shown as including first through ninth IGBTs Q1-Q8 having associated first through ninth parallel-connected diodes D1-D9. The first transistor Q1 is configured to connect the first terminal 1611a of the first port 1611 to the first terminal 1612a of the second port 1612. The second transistor Q2 is configured to connect the first terminal 1612a of the second port 1612 to a midpoint interconnection node N3. The third transistor Q3 is configured to connect the second terminal 1612b of the second port 1612 to the midpoint interconnection node N3. The fourth transistor Q4 is configured to connect the second terminal 1611b of the first port 1611 to the second terminal 1612b of the second port 1612. The fifth transistor Q5 and the sixth transistor Q6 act as a bidirectional switch configured to connect the first terminal 1612a of the second port 1612 to an interconnection node N2. The seventh transistor Q7 and the eight transistor Q8 act as a bidirectional switch configured to connect the second terminal 1612b of the second port to an interconnection node N4. The ninth transistor Q9 connects the first terminal 1612a of the second port 1612 directly to the second terminal 1612b of the second port 1612. A control circuit 1620 controls the transistors Q1-Q9 responsive to a voltage $v_1$ across the first capacitor C1 and the second capacitor C2, a voltage $v_2$ across the third capacitor C3 and the fourth capacitor C4, and a voltage $v_3$ across the second capacitor C2 and the third capacitor C3. In the apparatus 1600, the second transistor Q2, the third transistor Q3, the fifth transistor Q5, the sixth transistor Q6, the seventh transistor Q7, and the eighth transistor Q8 may have a lower voltage rating than the first transistor Q1, the fourth transistor Q4 and the ninth transistor Q9.

Figure 17:
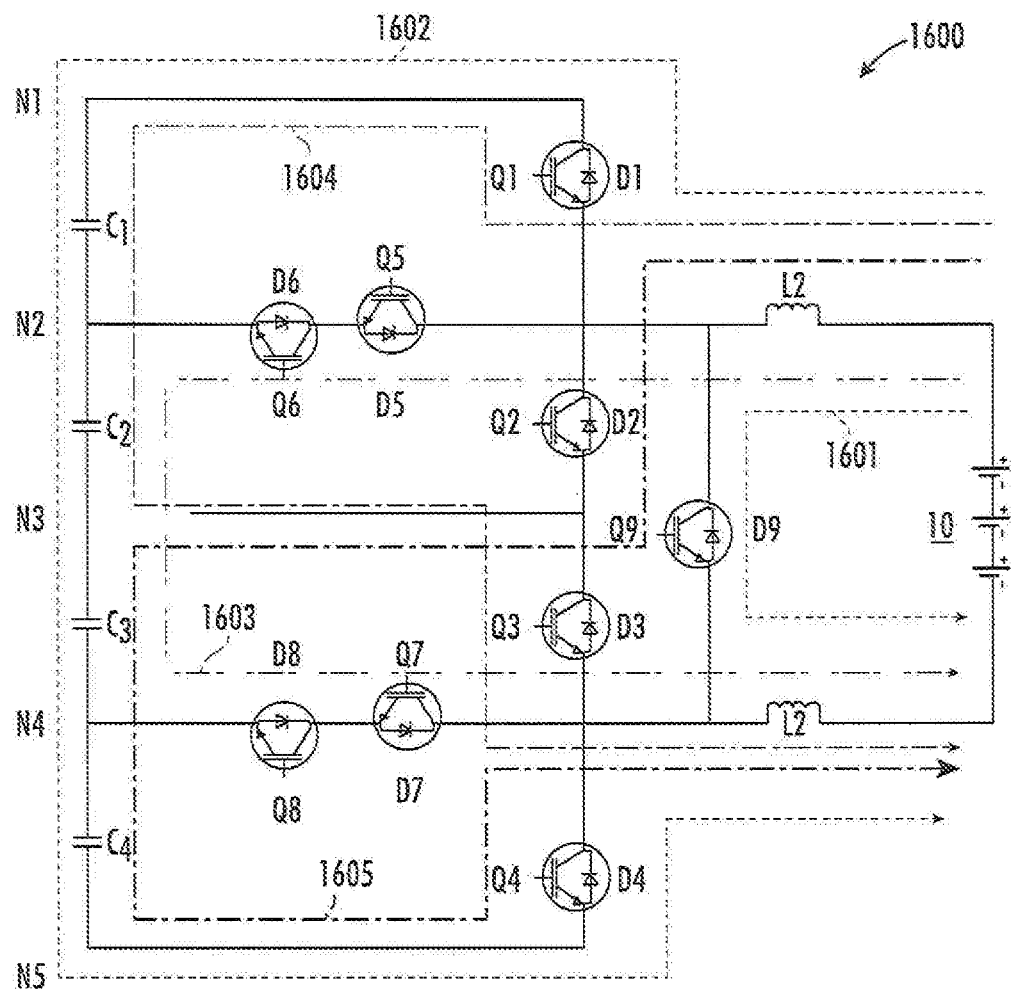
Figure 18:
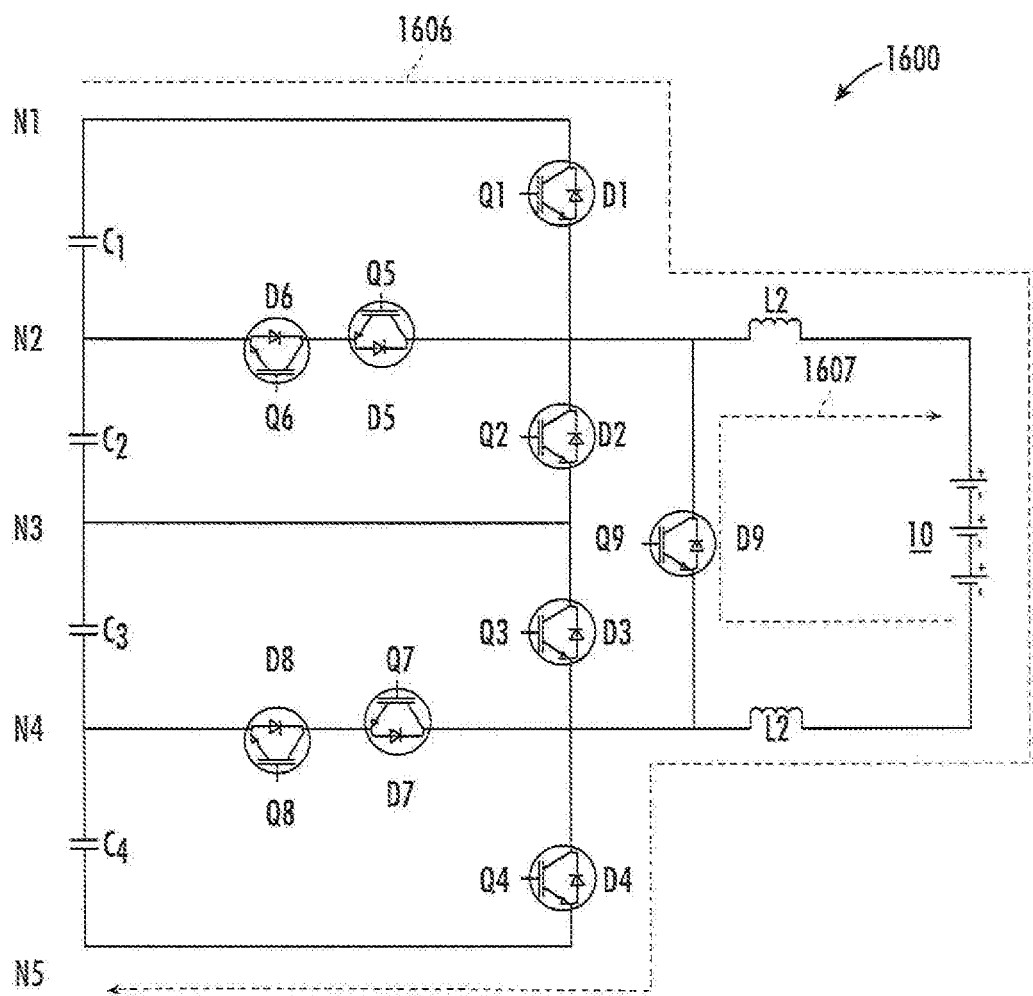

FIGS. 17 and 18 illustrate operations of the converter apparatus 1600 according to some embodiments. In first intervals of a boost mode, the control circuit 1620 turns on the ninth transistor Q9 to conduct a first current 1601 through the first and second inductors L1, L2, thus charging the inductor L1, L2. In second intervals succeeding respective ones of the first intervals, the second transistor Q2, the third transistor Q3, the fifth transistor Q5, the sixth transistor Q6, the seventh transistor Q7, and the eighth transistor Q8 can be selectively turned on to selectively charge the capacitors C1-C4 from the charged first and second inductors L1, L2. When the voltages $v_1$, $v_2$, $v_3$ across all of the capacitors C1-C4 are balanced, the capacitors C1-C4 may be simultaneously charged by a second current 1602 passing through the first diode D1 and the fourth diode D4. If the voltage $v_3$ requires boosting, the second capacitor C2 and the third capacitor C3 may be charged by turning on the fifth transistor Q5, the sixth transistor Q6, the seventh transistor Q7, and the eighth transistor Q8 to conduct a third current 1603. If the voltage $v_1$ requires boosting, the first capacitor C1 and the second capacitor C2 can be charged by turning on the third transistor Q3 to conduct a fourth current 1604. Similarly, if the voltage $v_2$ requires boosting, the third capacitor C3 and the fourth capacitor C4 can be charged by turning on the second transistor Q2 to conduct a fifth current 1605. Referring to FIG. 12, in first intervals of a buck mode, the apparatus 1600 turns on the first transistor Q1 and the fourth transistor Q4 to conduct a sixth current 1606 that charges the first and second inductors L1, L2, and then the transistors are turned off and a seventh current 1607 freewheels through the ninth diode D9 to charge the battery 10.

Figure 19:
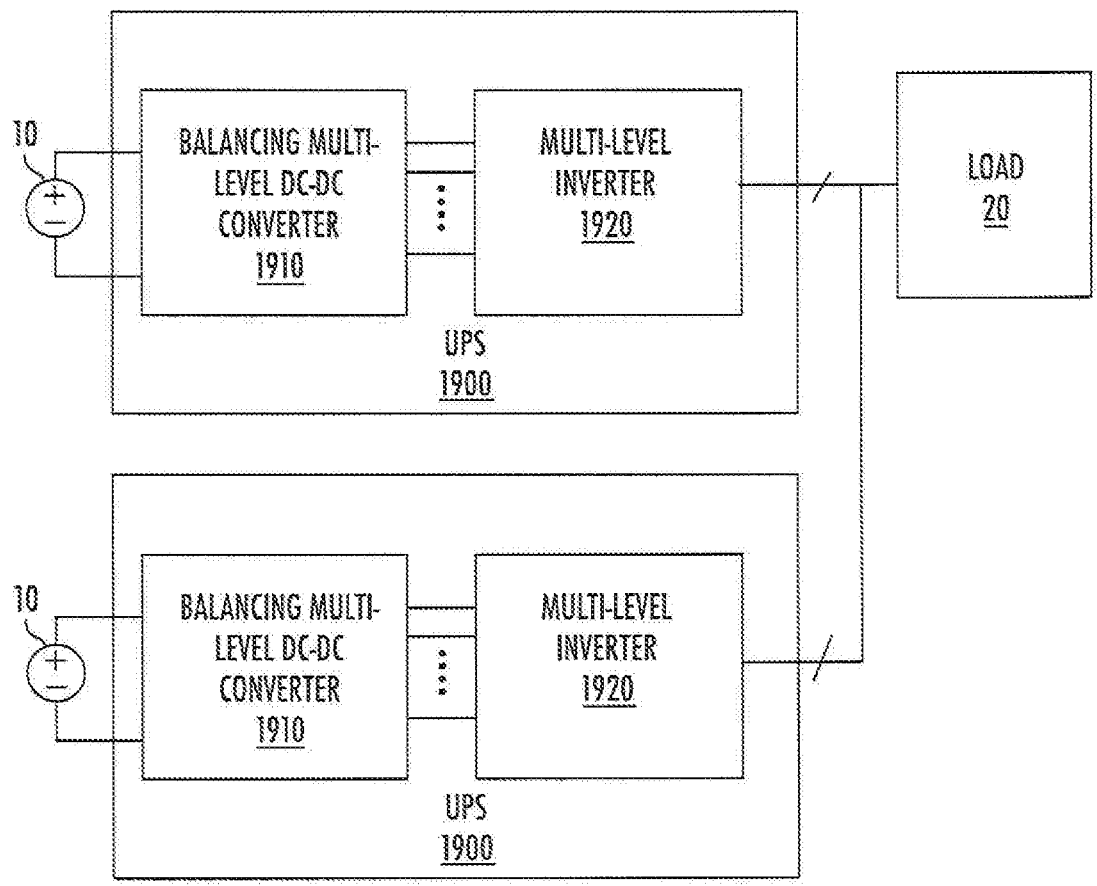
FIG. 19 illustrates an uninterruptible power supply (UPS) system according to some embodiments.

As noted above, DC-DC convertor apparatus according to some embodiments may be advantageously used in paralleled multi-level inverter applications. For example, in an example application illustrated in FIG. 19, parallel-connected UPSs 1900 may each include multi-level inverters 1920 that are connected in common to a load 20. Respective balancing multi-level DC-DC converters 1910 along lines discussed above may couple the multi-level inverters 1920 to respective DC sources 10, such as batteries, capacitor banks and/or fuel cells. Such an arrangement can be used to reduce or eliminate circulating currents among the UPSs 1900, as the balancing multi-level DC-DC converters 1910 can equalize the DC voltages applied to the multi-level inverters 1920. Similar arrangements may be used other inverter-paralleling applications, such as in grid-tied energy storage applications, motor drives and the like.

In the drawings and specification, there have been disclosed exemplary embodiments of the inventive subject matter. Although specific terms are employed, they are used in a generic and descriptive sense only and not for purposes of limitation, the scope of the inventive subject matter being defined by the following claims.

That which is claimed:

1. An apparatus comprising:
    a string of capacitors comprising at least two capacitors coupled in series;
    a switching circuit comprising a first port having first and second terminals connected to a first node and a second end node, respectively, of the string of capacitors and a second port configured to be coupled to an energy storage device, the switching circuit configured to selectively connect first and second terminals of the second port to a first end node, a second end node, and at least one interconnection node of the string of capacitors;
    at least one inductor configured to be coupled in series with the second port of the switching circuit and the energy storage device;
    a charging switch configured to directly connect the first terminal of the second port to the second terminal of the second port; and
    a control circuit configured to close the charging switch to charge the at least one inductor from the energy storage device in first intervals and to selectively close at least two switches of the switching circuit in second intervals to selectively charge the capacitors of the string of capacitors from the charged at least one inductor.

2. The apparatus of claim 1:
    wherein the switching circuit comprises at least one first switch configured to connect the first terminal of the first port to a first terminal of the second port, at least one second switch configured to connect the second terminal of the first port to a second terminal of the second port, and at least two third switches configured to connect the first and second terminals of the second port to the at least one interconnection node; and
    wherein the control circuit configured to selectively close the at least two third switches in the second intervals to selectively charge the capacitors of the string of capacitors from the charged at least one inductor.

3. The apparatus of claim 2, wherein at least two third switches comprise respective switches configured to connect respective ones of the first and second terminals of the second port to a midpoint interconnection node of the string of capacitors.

4. The apparatus of claim 2, wherein the at least two third switches comprise:
    a first plurality of switches configured to connect the first terminal of the second port to a first set of interconnection nodes of the string of capacitors; and
    a second plurality of switches configured to connect the second terminal of the second port to a second set of interconnection nodes of the string of capacitors.

5. The apparatus of claim 4, wherein the first and second sets of interconnection nodes each comprise a midpoint interconnection node.

6. The apparatus of claim 2, wherein the control circuit is configured to sense at least one voltage across at least one of the capacitors of the string of capacitors and to selectively close the at least two third switches in the second intervals responsive to the sensed at least one voltage.

7. The apparatus of claim 6, wherein the control circuit is configured to selectively close the at least two third switches in the second intervals responsive to the sensed at least one voltage to balance voltages across the capacitors of the string of capacitors.

8. The apparatus of claim 2, wherein the at least two third switches comprise a first transistor having a first voltage rating and wherein the charging switch comprises a second transistor having a second voltage rating greater than the first voltage rating.

9. The apparatus of claim 1, further comprising an inverter coupled to the first port of the switching circuit.

10. An apparatus comprising:
    a string of capacitors comprising at least two capacitors coupled in series;

a switching circuit comprising:
    a first port having first and second terminals connected to respective first and second end nodes of the string of capacitors;
    a second port configured to be coupled to an energy storage device;
    at least one first switch configured to connect the first terminal of the first port to a first terminal of the second port;
    at least one second switch configured to connect the second terminal of the first port to a second terminal of the second port;
    at least one third switch configured to connect the first terminal of the second port to a first interconnection node of the string of capacitors;
    at least one fourth switch configured to connect the second terminal of the second port to a second interconnection node of the string of capacitors;
    at least one fifth switch configured to connect the first terminal of the second port to a midpoint interconnection node of the string of capacitors; and
    at least one sixth switch configured to connect the second terminal of the second port to the midpoint interconnection node;
at least one inductor configured to be coupled in series with the second port of the switching circuit and the energy storage device; and
a control circuit configured to cause the switching circuit to charge the at least one inductor in first intervals and to selectively close the at least one third switch, the at least one fourth switch, the at least one fifth switch, and the at least one sixth switch in second intervals to selectively charge the capacitors of the string of capacitors from the charged at least one inductor, wherein the control circuit is configured to sense at least one voltage across at least one of the capacitors of the string of capacitors and to selectively close the at least one third switch, the at least one fourth switch, the at least one fifth switch, and the at least one sixth switch in the second intervals responsive to the sensed at least one voltage.

11. The apparatus of claim 10, wherein the control circuit is configured to close the at least one third switch and the at least one fourth switch to charge inner capacitors of the string of capacitors, to close the at least one fifth switch to charge a first outer capacitor of the string of capacitors, and to close the at least one sixth switch to charge a second outer capacitor of the string of capacitors.

12. The apparatus of claim 10, wherein the control circuit is configured to close the at least one fifth switch and the at least one sixth switch in the first intervals to charge the at least one inductor.

13. The apparatus of claim 10, wherein the switching circuit further comprises at least one seventh switch configured to directly connect the first terminal of the second port to the second terminal of the second port, and wherein the control circuit is configured to close the at least one seventh switch in the first intervals to charge the at least one inductor.

14. The apparatus of claim 10, wherein the at least one third switch comprises two series-connected transistors and wherein the at least one fourth switch comprises two series-connected transistors.

15. An apparatus comprising:
a string of capacitors comprising at least two capacitors coupled in series;
a switching circuit comprising:
    a first port having first and second terminals connected to respective first and second end nodes of the string of capacitors;
    a second port configured to be coupled to an energy storage device;
    at least one first switch configured to connect the first terminal of the first port to a first terminal of the second port;
    at least one second switch configured to connect the second terminal of the first port to a second terminal of the second port;
    at least one third switch configured to connect the first terminal of the second port to a first interconnection node of the string of capacitors;
    at least one fourth switch configured to connect the second terminal of the second port to a second interconnection node of the string of capacitors;
    at least one fifth switch configured to connect the at least one third switch to a midpoint interconnection node of the string of capacitors; and
    at least one sixth switch configured to connect the at least one fourth switch to the midpoint interconnection node;
at least one inductor configured to be coupled in series with the second port of the switching circuit and the energy storage device; and
a control circuit configured to cause the switching circuit to charge the at least one inductor in first intervals and to selectively close the at least one third switch, the at least one fourth switch, the at least one fifth switch, and the at least one sixth switch in second intervals to selectively charge the capacitors of the string of capacitors from the charged at least one inductor.

16. The apparatus of claim 15, wherein the at least one third switch is configured to connect the first terminal of the second port to the first interconnection node via a first diode and wherein the at least one fourth switch is configured to connect the second terminal of the second port to the second interconnection node via a second diode.

17. The apparatus of claim 15, wherein the control circuit is configured to close the at least one third switch, the at least one fourth switch, the at least one fifth switch, and the at least one sixth switch in the first intervals to charge the at least one inductor.

18. The apparatus of claim 15, wherein the switching circuit comprises at least one seventh switch configured to directly connect the first port of the second terminal to the second terminal of the second port, and wherein the control circuit is configured to close the at least one seventh switch in the first intervals to charge the at least one inductor.

19. The apparatus of claim 15, wherein the control circuit is configured to sense at least one voltage across at least one of the capacitors of the string of capacitors and to selectively close the at least one third switch, the at least one fourth switch, the at least one fifth switch, and the at least one sixth switch in the second intervals responsive to the sensed at least one voltage.

\* \* \* \* \*

UNITED STATES PATENT AND TRADEMARK OFFICE
CERTIFICATE OF CORRECTION

| | |
|---|---|
| PATENT NO. | : 11,088,615 B2 |
| APPLICATION NO. | : 16/549867 |
| DATED | : August 10, 2021 |
| INVENTOR(S) | : McBryde et al. |

It is certified that error appears in the above-identified patent and that said Letters Patent is hereby corrected as shown below:

On the Title Page

(73) Assignee: Please correct Assignee to read -- Eaton Intelligent Power Limited (IE) --

Column 2, Line 10, (57) ABSTRACT: Please correct "the siring of capacitors" to read -- the string of capacitors --

In the Specification

Column 2, Line 66: Please correct "one filth switch" to read -- one fifth switch --

Signed and Sealed this
Tenth Day of May, 2022

Katherine Kelly Vidal
*Director of the United States Patent and Trademark Office*